United States Patent
Hsu et al.

(10) Patent No.: US 10,976,625 B2
(45) Date of Patent: Apr. 13, 2021

(54) DISPLAY PANEL

(71) Applicants: HannStar Display (Nanjing) Corporation, Nanjing (CN); HannStar Display Corporation, Taipei (TW)

(72) Inventors: Wei-Chih Hsu, Taichung (TW); Chen-Hao Su, Taichung (TW); Yu-Chen Liu, Taichung (TW)

(73) Assignees: HannStar Display (Nanjing) Corporation, Nanjing (CN); HannStar Display Corporation, Taipei (TW)

( * ) Notice: Subject to any disclaimer, the term of this patent is extended or adjusted under 35 U.S.C. 154(b) by 0 days.

(21) Appl. No.: 16/779,650

(22) Filed: Feb. 2, 2020

(65) Prior Publication Data

US 2020/0174330 A1 Jun. 4, 2020

Related U.S. Application Data

(63) Continuation-in-part of application No. 15/613,290, filed on Jun. 5, 2017, now Pat. No. 10,593,283.

(30) Foreign Application Priority Data

Jun. 8, 2016 (CN) .......................... 201610404033.1

(51) Int. Cl.
  *G09G 3/36* (2006.01)
  *G02F 1/1362* (2006.01)
  (Continued)

(52) U.S. Cl.
  CPC ...... *G02F 1/136286* (2013.01); *G02F 1/1368* (2013.01); *G02F 1/133345* (2013.01);
  (Continued)

(58) Field of Classification Search
  CPC ............ G02F 1/133345; G02F 1/1368; G02F 1/136204; G02F 1/134363;
  (Continued)

(56) References Cited

U.S. PATENT DOCUMENTS

2002/0186191 A1* 12/2002 Ikeda ................... G09G 3/3648
                                                                         345/87
2005/0024548 A1   2/2005 Choi et al.
  (Continued)

FOREIGN PATENT DOCUMENTS

CN       101211038 A     7/2008
CN       101523279 B     4/2012
  (Continued)

*Primary Examiner* — Hoan C Nguyen
(74) *Attorney, Agent, or Firm* — CKC & Partners Co., LLC

(57) ABSTRACT

The display panel includes a first substrate, a second substrate, pixel structures, a liquid crystal layer and a transparent conductive layer. The liquid crystal layer is disposed between the pixel structures and the second substrate. The transparent conductive layer is disposed between the second substrate and the liquid crystal layer. When a liquid crystal molecule of the liquid crystal layer is a positive liquid crystal molecule, an absolute voltage difference between the transparent conductive layer and the common electrode is smaller than or equal to 2.3 volts(V). When the liquid crystal molecule of the liquid crystal layer is a negative liquid crystal molecule, the absolute voltage difference between the transparent conductive layer and the common electrode is smaller than or equal to 5V.

13 Claims, 24 Drawing Sheets

(51) Int. Cl.
*G02F 1/1368* (2006.01)
*G02F 1/1333* (2006.01)
*G02F 1/1335* (2006.01)

(52) U.S. Cl.
CPC .. *G02F 1/133512* (2013.01); *G02F 2201/121* (2013.01); *G02F 2201/123* (2013.01); *G02F 2201/124* (2013.01)

(58) Field of Classification Search
CPC ......... G02F 1/133514; G02F 1/133512; G02F 2202/22; G02F 2201/50; G02F 2201/124; G02F 2201/123; G02F 2201/121; G02F 2001/133519; G09G 3/3696; G09G 2300/0426; G09G 2320/0233
See application file for complete search history.

(56) References Cited

U.S. PATENT DOCUMENTS

| | | |
|---|---|---|
| 2009/0046232 A1 | 2/2009 | Matsuyama et al. |
| 2009/0058785 A1* | 3/2009 | Kim ................ G09G 3/3655 345/96 |
| 2009/0066626 A1* | 3/2009 | Su ................ G09G 3/3648 345/92 |
| 2010/0128189 A1 | 5/2010 | Teranishi et al. |
| 2010/0315402 A1* | 12/2010 | Hashimoto ........ G09G 3/3648 345/211 |
| 2011/0134350 A1 | 6/2011 | Yamazaki et al. |
| 2011/0285940 A1 | 11/2011 | Kubota et al. |
| 2013/0300996 A1 | 11/2013 | Takeuchi et al. |
| 2014/0036192 A1 | 2/2014 | Iyama et al. |
| 2014/0347588 A1 | 11/2014 | Hatsumi et al. |
| 2015/0153620 A1 | 6/2015 | Iwata et al. |
| 2015/0177571 A1 | 6/2015 | Yoshida et al. |
| 2018/0284510 A1 | 10/2018 | Um et al. |
| 2019/0179180 A1* | 6/2019 | Chung ................ G02F 1/1343 |
| 2019/0278117 A1* | 9/2019 | Chung ................ G02F 1/1343 |

FOREIGN PATENT DOCUMENTS

| | | |
|---|---|---|
| CN | 103217821 A | 7/2013 |
| CN | 101738792 B | 11/2013 |
| CN | 102193255 B | 3/2014 |
| CN | 101387798 B | 4/2014 |

* cited by examiner

| | 0V | 1V | 1.1V | 1.2V | 1.3V | 1.4V | 1.5V | 1.6V | 1.7V | 1.8V | 1.9V | 2V | 2.1V | 2.2V | 2.3V | 2.4V | 2.6V | 2.7V | 2.8V | 2.9V | 3.0V | 4V | 5V |
|---|---|---|---|---|---|---|---|---|---|---|---|---|---|---|---|---|---|---|---|---|---|---|---|
| 0 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.7 | 0.9 | 1.2 | 1.4 | 1.7 | 2.0 | 7.4 | 13.1 |
| 0.5 | 0.6 | 0.6 | 0.6 | 0.6 | 0.7 | 0.7 | 0.7 | 0.7 | 0.8 | 0.8 | 0.9 | 1.0 | 1.1 | 1.3 | 1.7 | 2.1 | 3.7 | 4.8 | 6.1 | 7.6 | 9.2 | 30.3 | 42.2 |
| 1 | 1.7 | 2.0 | 2.3 | 2.4 | 2.6 | 2.6 | 2.7 | 3.0 | 3.2 | 3.4 | 3.8 | 4.1 | 4.4 | 5.4 | 6.4 | 7.3 | 10.6 | 13.0 | 15.6 | 18.5 | 22.3 | 61.7 | 82.5 |
| 1.5 | 9.0 | 12.2 | 13.7 | 13.2 | 15.2 | 15.8 | 15.7 | 17.2 | 19.0 | 21.1 | 21.2 | 22.3 | 21.1 | 28.5 | 29.7 | 25.2 | 32.0 | 32.6 | 35.9 | 39.6 | 44.1 | 98.9 | 128 |
| 2 | 45.3 | 70.0 | 70.4 | 77.6 | 77.6 | 81.0 | 82.8 | 73.1 | 89.2 | 90.8 | 96.3 | 93.5 | 110 | 109 | 104 | 85.8 | 84.0 | 87.1 | 83.1 | 83.3 | 85.7 | 144 | 174 |
| 2.5 | 200 | 206 | 218 | 215 | 220 | 222 | 232 | 236 | 235 | 236 | 248 | 253 | 258 | 262 | 261 | 248 | 274 | 271 | 181 | 170 | 160 | 202 | 220 |
| 3 | 350 | 370 | 380 | 383 | 388 | 389 | 394 | 397 | 401 | 405 | 409 | 413 | 423 | 421 | 432 | 421 | 423 | 416 | 427 | 409 | 401 | 259 | 267 |
| 3.5 | 473 | 504 | 515 | 520 | 525 | 525 | 527 | 532 | 534 | 538 | 543 | 544 | 548 | 550 | 550 | 551 | 550 | 544 | 548 | 530 | 512 | 321 | 312 |
| 4 | 556 | 597 | 610 | 613 | 616 | 620 | 624 | 626 | 628 | 630 | 633 | 635 | 639 | 640 | 640 | 640 | 639 | 636 | 635 | 626 | 604 | 370 | 348 |
| 4.5 | 607 | 653 | 668 | 671 | 675 | 678 | 681 | 683 | 686 | 688 | 690 | 692 | 693 | 694 | 694 | 695 | 692 | 690 | 688 | 682 | 669 | 411 | 378 |
| 5 | 632 | 681 | 697 | 701 | 704 | 708 | 711 | 714 | 716 | 718 | 719 | 720 | 722 | 722 | 722 | 722 | 719 | 717 | 715 | 710 | 702 | 440 | 402 |
| CR | 1264 | 1362 | 1393 | 1401 | 1407 | 1412 | 1416 | 1417 | 1418 | 1414 | 1414 | 1411 | 1349 | 1362 | 1366 | 1054 | 764 | 619 | 515 | 419 | 347 | 60 | 31 |

FIG. 7A

| | 0V | 1V | 2V | 2.1V | 2.2V | 2.3V | 2.4V | 2.5V | 2.6V | 2.7V | 2.8V | 2.9V | 3.0V | 4V | 5V |
|---|---|---|---|---|---|---|---|---|---|---|---|---|---|---|---|
| 0 | 0.50 | 0.50 | 0.50 | 0.50 | 0.50 | 0.50 | 0.50 | 0.50 | 0.50 | 0.50 | 0.51 | 0.51 | 0.51 | 0.51 | 0.53 |
| 0.5 | 0.54 | 0.57 | 0.62 | 0.63 | 0.63 | 0.63 | 0.64 | 0.63 | 0.66 | 0.66 | 0.66 | 0.66 | 0.67 | 0.71 | 0.75 |
| 1 | 1.19 | 1.49 | 1.72 | 1.71 | 1.77 | 1.78 | 1.80 | 1.80 | 1.82 | 1.84 | 1.84 | 1.85 | 1.87 | 1.96 | 1.94 |
| 1.5 | 5.21 | 6.41 | 7.36 | 7.67 | 7.53 | 7.69 | 7.64 | 8.04 | 7.94 | 7.57 | 7.35 | 7.72 | 7.56 | 7.04 | 6.58 |
| 2 | 23.5 | 32.3 | 34.5 | 32.2 | 31.2 | 33.6 | 32.8 | 30.4 | 30.9 | 30.3 | 31.7 | 27.0 | 35.1 | 26.0 | 21.9 |
| 2.5 | 81.8 | 98.6 | 142 | 136 | 142 | 142 | 110 | 118 | 122 | 105 | 117 | 106 | 121 | 116 | 96.5 |
| 3 | 245 | 273 | 303 | 320 | 319 | 322 | 301 | 319 | 296 | 314 | 312 | 305 | 292 | 286 | 226 |
| 3.5 | 394 | 451 | 479 | 481 | 483 | 482 | 482 | 482 | 480 | 480 | 481 | 478 | 479 | 458 | 427 |
| 4 | 524 | 580 | 601 | 607 | 607 | 605 | 602 | 607 | 604 | 606 | 606 | 610 | 602 | 587 | 560 |
| 4.5 | 625 | 667 | 686 | 690 | 692 | 684 | 689 | 686 | 691 | 692 | 694 | 689 | 690 | 673 | 655 |
| 5 | 692 | 724 | 739 | 739 | 737 | 739 | 739 | 739 | 740 | 739 | 743 | 741 | 738 | 732 | 714 |
| CR | 1381 | 1444 | 1471 | 1469 | 1465 | 1468 | 1467 | 1464 | 1468 | 1463 | 1470 | 1465 | 1457 | 1422 | 1353 |

FIG. 7C

| | 0V | 1V | 1.1V | 1.2V | 1.3V | 1.4V | 1.5V | 1.6V | 1.7V | 1.8V | 1.9V | 2V |
|---|---|---|---|---|---|---|---|---|---|---|---|---|
| 0 | 0.0100% | 0.0100% | 0.0100% | 0.0100% | 0.0100% | 0.0100% | 0.0100% | 0.0101% | 0.0101% | 0.0102% | 0.0102% | 0.0102% |
| 0.5 | 0.01% | 0.01% | 0.01% | 0.01% | 0.01% | 0.01% | 0.01% | 0.01% | 0.02% | 0.02% | 0.02% | 0.02% |
| 1 | 0.03% | 0.04% | 0.05% | 0.05% | 0.05% | 0.05% | 0.05% | 0.06% | 0.06% | 0.07% | 0.08% | 0.08% |
| 1.5 | 0.18% | 0.24% | 0.27% | 0.26% | 0.30% | 0.32% | 0.31% | 0.34% | 0.38% | 0.42% | 0.42% | 0.45% |
| 2 | 0.91% | 1.40% | 1.41% | 1.55% | 1.55% | 1.62% | 1.66% | 1.46% | 1.78% | 1.82% | 1.93% | 1.87% |
| 2.5 | 4.01% | 4.13% | 4.36% | 4.31% | 4.40% | 4.45% | 4.63% | 4.71% | 4.69% | 4.72% | 4.95% | 5.06% |
| 3 | 7.01% | 7.40% | 7.59% | 7.67% | 7.75% | 7.78% | 7.89% | 7.94% | 8.01% | 8.10% | 8.18% | 8.26% |
| 3.5 | 9.45% | 10.07% | 10.30% | 10.39% | 10.50% | 10.49% | 10.53% | 10.64% | 10.68% | 10.75% | 10.85% | 10.88% |
| 4 | 11.12% | 11.94% | 12.20% | 12.26% | 12.33% | 12.39% | 12.49% | 12.51% | 12.55% | 12.60% | 12.65% | 12.70% |
| 4.5 | 12.13% | 13.07% | 13.36% | 13.42% | 13.49% | 13.55% | 13.62% | 13.66% | 13.73% | 13.75% | 13.81% | 13.83% |
| 5 | 12.64% | 13.62% | 13.94% | 14.03% | 14.09% | 14.16% | 14.22% | 14.27% | 14.32% | 14.36% | 14.38% | 14.41% |

FIG. 8C

| | 2.1V | 2.2V | 2.3V | 2.4V | 2.5V | 2.6V | 2.7V | 2.8V | 2.9V | 3.0V | 4V | 5V |
|---|---|---|---|---|---|---|---|---|---|---|---|---|
| 0 | 0.0107% | 0.0106% | 0.0106% | 0.0137% | 0.0158% | 0.0188% | 0.0232% | 0.0277% | 0.0339% | 0.0405% | 0.1479% | 0.2628% |
| 0.5 | 0.02% | 0.03% | 0.03% | 0.04% | 0.06% | 0.07% | 0.10% | 0.12% | 0.15% | 0.18% | 0.61% | 0.84% |
| 1 | 0.09% | 0.11% | 0.13% | 0.15% | 0.18% | 0.21% | 0.26% | 0.31% | 0.37% | 0.45% | 1.23% | 1.65% |
| 1.5 | 0.42% | 0.57% | 0.59% | 0.50% | 0.59% | 0.64% | 0.65% | 0.72% | 0.79% | 0.88% | 1.98% | 2.56% |
| 2 | 2.19% | 2.18% | 2.08% | 1.72% | 1.89% | 1.68% | 1.74% | 1.66% | 1.67% | 1.71% | 2.88% | 3.49% |
| 2.5 | 5.15% | 5.23% | 5.22% | 4.95% | 5.30% | 5.47% | 5.43% | 3.61% | 3.40% | 3.19% | 4.05% | 4.40% |
| 3 | 8.46% | 8.41% | 8.63% | 8.41% | 8.45% | 8.45% | 8.32% | 8.54% | 8.18% | 8.02% | 5.18% | 5.33% |
| 3.5 | 10.96% | 11.00% | 11.01% | 11.02% | 11.02% | 11.01% | 10.88% | 10.97% | 10.59% | 10.24% | 6.43% | 6.23% |
| 4 | 12.78% | 12.80% | 12.80% | 12.80% | 12.80% | 12.78% | 12.71% | 12.69% | 12.52% | 12.08% | 7.39% | 6.96% |
| 4.5 | 13.85% | 13.89% | 13.88% | 13.91% | 13.89% | 13.84% | 13.80% | 13.76% | 13.65% | 13.37% | 8.21% | 7.55% |
| 5 | 14.43% | 14.44% | 14.45% | 14.44% | 14.43% | 14.39% | 14.35% | 14.29% | 14.20% | 14.03% | 8.79% | 8.03% |

FIG. 8D

| | 0V | 1V | 2V | 2.1V | 2.2V | 2.3V | 2.4V | 2.5V | 2.6V | 2.7V | 2.8V | 2.9V | 3V | 4V | 5V |
|---|---|---|---|---|---|---|---|---|---|---|---|---|---|---|---|
| 0 | 0.0100% | 0.0100% | 0.0101% | 0.0101% | 0.0101% | 0.0101% | 0.0101% | 0.0101% | 0.0101% | 0.0101% | 0.0101% | 0.0101% | 0.0101% | 0.0103% | 0.0105% |
| 0.5 | 0.01% | 0.01% | 0.01% | 0.01% | 0.01% | 0.01% | 0.01% | 0.01% | 0.01% | 0.01% | 0.01% | 0.01% | 0.01% | 0.01% | 0.01% |
| 1 | 0.02% | 0.03% | 0.03% | 0.03% | 0.04% | 0.04% | 0.04% | 0.04% | 0.04% | 0.04% | 0.04% | 0.04% | 0.04% | 0.04% | 0.04% |
| 1.5 | 0.10% | 0.13% | 0.15% | 0.15% | 0.15% | 0.15% | 0.15% | 0.16% | 0.16% | 0.15% | 0.15% | 0.15% | 0.15% | 0.14% | 0.13% |
| 2 | 0.47% | 0.65% | 0.69% | 0.64% | 0.62% | 0.57% | 0.66% | 0.61% | 0.62% | 0.61% | 0.63% | 0.54% | 0.70% | 0.52% | 0.44% |
| 2.5 | 1.64% | 1.97% | 2.83% | 2.71% | 2.84% | 2.85% | 2.19% | 2.36% | 2.44% | 2.10% | 2.34% | 2.12% | 2.42% | 2.33% | 1.93% |
| 3 | 4.90% | 5.47% | 6.07% | 6.41% | 6.38% | 6.44% | 6.02% | 6.38% | 5.92% | 6.29% | 6.25% | 6.11% | 5.84% | 5.72% | 4.51% |
| 3.5 | 7.87% | 9.03% | 9.57% | 9.62% | 9.67% | 9.65% | 9.64% | 9.65% | 9.61% | 9.61% | 9.62% | 9.57% | 9.59% | 9.15% | 8.54% |
| 4 | 10.47% | 11.60% | 12.02% | 12.14% | 12.14% | 12.10% | 12.05% | 12.15% | 12.09% | 12.12% | 12.15% | 12.20% | 12.04% | 11.73% | 11.21% |
| 4.5 | 12.50% | 13.34% | 13.72% | 13.80% | 13.84% | 13.68% | 13.77% | 13.72% | 13.82% | 13.85% | 13.87% | 13.78% | 13.81% | 13.47% | 13.10% |
| 5 | 13.84% | 14.47% | 14.79% | 14.77% | 14.74% | 14.78% | 14.79% | 14.77% | 14.81% | 14.78% | 14.87% | 14.82% | 14.75% | 14.65% | 14.27% |

FIG. 8E

DISPLAY PANEL

CROSS-REFERENCE TO RELATED APPLICATION

This application is a Continuation-in-part of U.S. application Ser. No. 15/613,290 filed on Jun. 5, 2017, which claims priority to China Application Serial Number 201610404033.1 filed Jun. 8, 2016, all of which are herein incorporated by reference.

BACKGROUND

Field of Invention

The present invention relates to a display panel. More particularly, the present invention relates to a transverse-electric-field type display panel in which a transparent conductive layer is additionally disposed between two substrates.

Description of Related Art

In general, a shielding electrode layer is disposed on a surface of a color filter substrate opposite to a liquid crystal layer in a display panel in order to prevent the vision effect of the display panel from being affected by the accumulation of electrostatic charges. The shielding electrode layer has to be transparent, and therefore the material of the shielding electrode layer generally includes transparent conductive material such as Indium tin oxide (ITO). FIG. 1 is a diagram illustrating a cross-sectional view of a conventional transverse-electric-field type display panel. Referring to FIG. 1, a display panel 100 includes a shielding electrode layer 110, an upper substrate 120, a black matrix layer 130, an overcoating layer 140, a liquid crystal layer 150, a common electrode 161, an insulation layer 162, a pixel electrode 163 and a lower substrate 170. A transverse electric field is generated between the common electrode 161 and the pixel electrode 163 to change the orientation of a liquid crystal molecule. The shielding electrode layer 110 can prevent the display performance of the panel from being affected by the electrostatic charges or electromagnetic waves. However, in the conventional art, the shielding electrode layer is formed on the surface of the color filter substrate opposite to the liquid crystal layer while a thinner display panel gradually becomes the mainstream of the market, and therefore in general, a thinning process is performed after the thin film transistor substrate is bonded to the color filter substrate, and then the shielding electrode layer is formed on the color filter substrate. The conventional process is very complicated and the transportation cost is relatively high. The recent trend is that the shielding electrode layer is formed on the surface of the color filter substrate facing the liquid crystal layer before the process of bonding the thin film transistor substrate with the color filter substrate and the thinning process. For the transverse-electric-field type display panel, the operation of moving the shielding electrode layer into the inner side of the color filter substrate results in that the vertical electric field between the shielding electrode layer and the pixel electrode causes an unpredictable orientation of the liquid crystal molecule, and thus the display performance is affected. Therefore, it is an issue for the people in the art about how to address the display-performance problem caused by moving the shielding electrode layer into the inner side of the color filter substrate.

SUMMARY

An objective of the invention is to provide a display panel with better transmittance or contrast ratio.

Embodiments of the present invention provide a display panel including a first substrate, a second substrate, first to $M^{th}$ gate lines, pixel structures, a liquid crystal layer and a transparent conductive layer. The second substrate is disposed opposite to the first substrate. The first to $M^{th}$ gate lines are disposed on the first substrate. First to $M^{th}$ gate signals are provided to the first to $M^{th}$ gate lines respectively, and the $i^{th}$ gate signal is at a high level in a first time period of a first frame and in a second time period of a second frame next to the first frame. M is a positive integer greater than or equal to 2, and i is a positive integer less than or equal to the positive integer M. The pixel structures are disposed between the first substrate and the second substrate. Each of the pixel structures includes a thin film transistor, a pixel electrode and a common electrode. The liquid crystal layer is disposed between the pixel structures and the second substrate. The transparent conductive layer is disposed between the second substrate and the liquid crystal layer. When a liquid crystal molecule of the liquid crystal layer is a positive liquid crystal molecule, an absolute voltage difference between the transparent conductive layer and the common electrode is smaller than or equal to 2.3 volts(V), the voltage of the transparent conductive layer is greater than the voltage of the common electrode in the first time period, the voltage of the transparent conductive layer is less than the voltage of the common electrode in the second time period, and the voltage of the common electrode in the first time period is the same as the voltage of the common electrode in the second time period. When the liquid crystal molecule of the liquid crystal layer is a negative liquid crystal molecule, the absolute voltage difference between the transparent conductive layer and the common electrode is smaller than or equal to 5V, the voltage of the transparent conductive layer is greater than the voltage of the common electrode in the first time period, the voltage of the transparent conductive layer is less than the voltage of the common electrode in the second period, and the voltage of the common electrode in the first time period is the same as the voltage of the common electrode in the second time period.

In some embodiments, when the liquid crystal molecule of the liquid crystal layer is the positive liquid crystal molecule, the absolute voltage difference between the transparent conductive layer and the common electrode is smaller than or equal to 2.3V and is greater than or equal to 1V.

In some embodiments, when the liquid crystal molecule of the liquid crystal layer is the positive liquid crystal molecule, the absolute voltage difference between the transparent conductive layer and the common electrode is smaller than or equal to 2V and is greater than or equal to 1.4V.

In some embodiments, when the liquid crystal molecule of the liquid crystal layer is the positive liquid crystal molecule, the absolute voltage difference between the transparent conductive layer and the common electrode is equal to 1.7V.

In some embodiments, when the liquid crystal molecule of the liquid crystal layer is the negative liquid crystal molecule, the absolute voltage difference between the transparent conductive layer and the common electrode is smaller than or equal to 4V and is greater than or equal to 1V.

In some embodiments, when the liquid crystal molecule of the liquid crystal layer is the negative liquid crystal molecule, the absolute voltage difference between the transparent conductive layer and the common electrode is smaller than or equal to 3V and is greater than or equal to 2V.

In some embodiments, when the liquid crystal molecule of the liquid crystal layer is the negative liquid crystal molecule, the absolute voltage difference between the transparent conductive layer and the common electrode is equal to 2V.

In some embodiments, an insulation layer is disposed on the thin film transistor. The insulation layer is disposed on the pixel electrode, the common electrode is disposed on the insulation layer, and the common electrode has multiple slits.

In some embodiments, an insulation layer is disposed on the thin film transistor. The insulation layer is disposed on the common electrode, the pixel electrode is disposed on the insulation layer, and the pixel electrode has multiple slits.

In some embodiments, an insulation layer is disposed on the thin film transistor. The pixel electrode and the common electrode are disposed on the insulation layer coplanarly. Each of the common electrode and the pixel electrode respectively comprises multiple finger-type electrodes, and the finger-type electrodes of the common electrode are interlaced with the finger-type electrodes of the pixel electrode.

In some embodiments, a black matrix layer is disposed between the second substrate and the liquid crystal layer. The transparent conductive layer is disposed between the second substrate and the black matrix layer.

In some embodiments, a black matrix layer is disposed between the second substrate and the liquid crystal layer. An over-coating layer is disposed between the black matrix layer and the liquid crystal layer. The transparent conductive layer is disposed between the black matrix layer and the over-coating layer.

In some embodiments, a black matrix layer is disposed between the second substrate and the liquid crystal layer. An over-coating layer is disposed between the black matrix layer and the liquid crystal layer. The transparent conductive layer is disposed between the over-coating layer and the liquid crystal layer.

In some embodiments, the absolute voltage difference between the transparent conductive layer and the common electrode in the first time period is the same as that in the second time period.

In some embodiments, the voltage of the common electrode has a direct current (DC) waveform, and the voltage of the transparent conductive layer has an alternative current (AC) waveform.

The invention, compared with the prior art, at least has advantages of better contrast ratio or transmittance.

BRIEF DESCRIPTION OF THE DRAWINGS

The invention can be more fully understood by reading the following detailed description of the embodiment, with reference made to the accompanying drawings as follows.

FIG. 7A illustrates a table for the brightness of display panel with respect to the voltage difference between the transparent conductive layer and the common electrode and the voltage difference between the pixel electrode and the common electrode in accordance with an embodiment.

FIG. 7C illustrates a table for the brightness of display panel with respect to the voltage difference between the transparent conductive layer and the common electrode and the voltage difference between the pixel electrode and the common electrode in accordance with another embodiment.

FIG. 8C, FIG. 8D and FIG. 8E illustrates tables for transmittance of the display panel with respect to the voltages difference between the transparent conductive layer and the common electrode in accordance with an embodiment.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that are produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

A transverse-electric-field type display panel such as an in-plane switching (IPS) display panel, an IPS-Pro display panel, a fringe field switching (FFS) display panel, or another display panel controlling liquid crystals by transverse electric field is provided. The transverse-electric-field type display panel includes a first substrate and a second substrate opposite to the each other. Multiple pixel structures and a liquid crystal layer are disposed between the first substrate and the second substrate. Note that the pixel structures described herein are the pixel structures disposed in the display region of the display panel and do not include dummy pixel. Each pixel structure includes a thin film transistor, a pixel electrode and a common electrode. In particular, a transparent conductive layer is disposed between the first substrate and the second substrate for shielding the display panel from static electricity or electromagnetic wave. Several embodiments will be provided below to describe the disposition and voltage of the transparent conductive layer (also referred to as a shielding electrode layer).

Figure 2A:
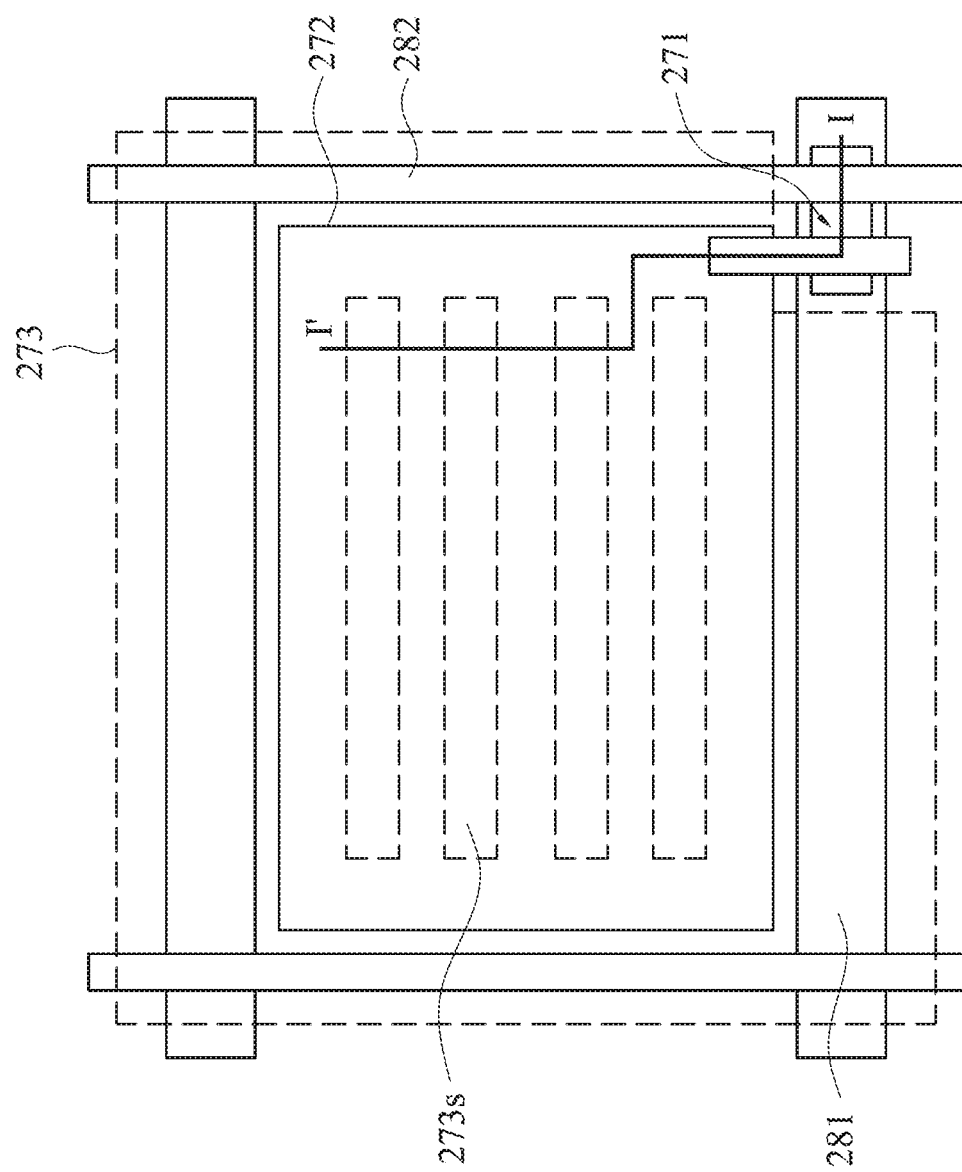
FIG. 2A is a diagram illustrating a top view of pixel structures in a display panel in accordance with an embodiment.
Figure 2B:
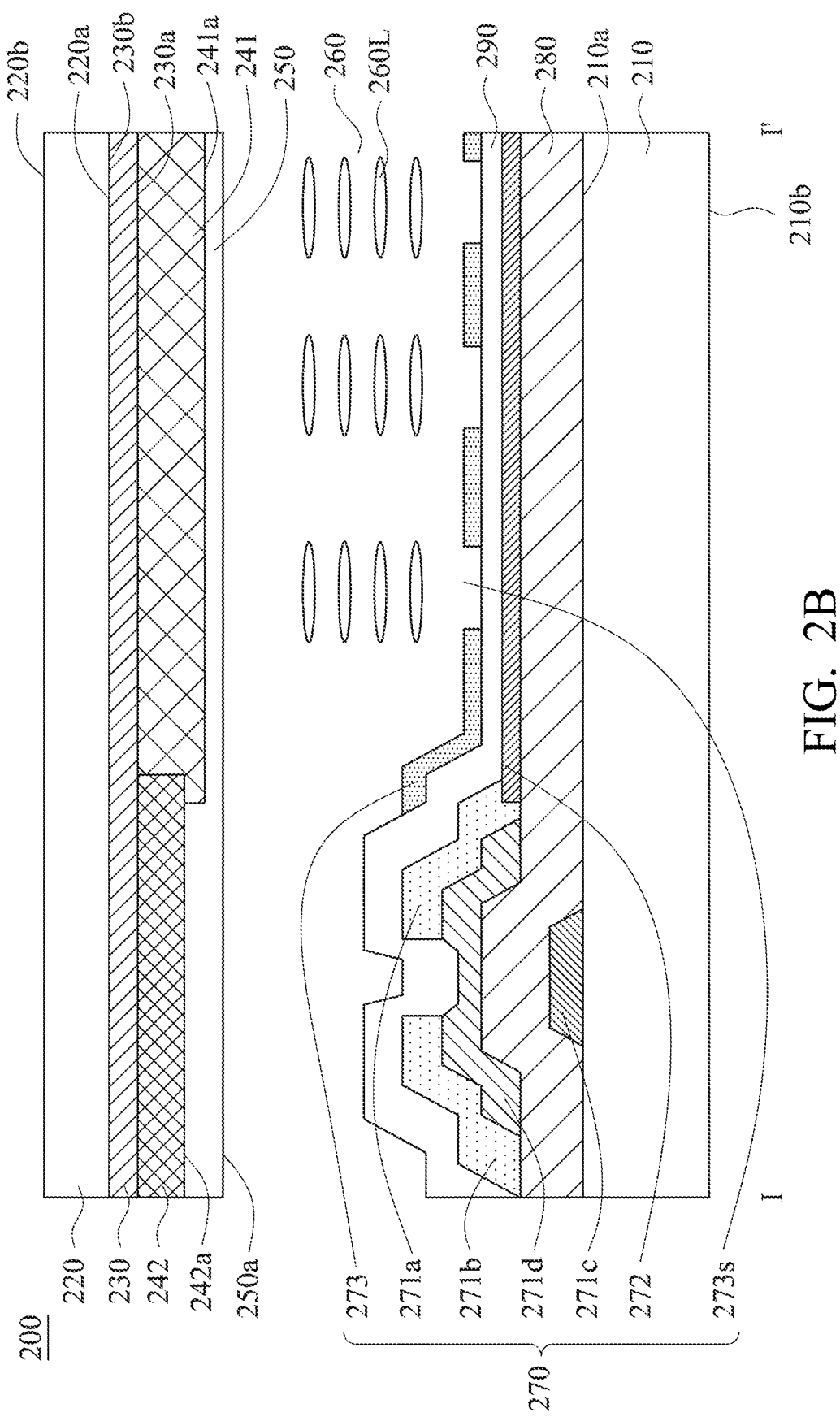
FIG. 2B-FIG. 2D are diagrams illustrating cross-sectional views of transverse-electric-field type display panels in accordance with three different embodiments.

Referring to FIG. 2A and FIG. 2B, FIG. 2A is a diagram illustrating a top view of pixel structures in a display panel in accordance with an embodiment, and FIG. 2B is a diagram illustrating a cross-sectional view of the display panel viewed along a cut line I-I' in FIG. 2A. A display panel 200 includes a first substrate 210 and a second substrate 220 opposite to the each other. The first substrate 210 has a first surface 210a and a second surface 210b opposite to the each other. The second substrate 220 has a first surface 220a and a second surface 220b opposite to the each other. The first surface 210a of the first substrate 210 faces the first surface 220a of the second substrate 220. A transparent conductive layer 230, a color filter layer 241, a black matrix layer 242, an over-coating layer 250, a liquid crystal layer 260 and a pixel structure 270 are disposed between the first substrate 210 and the second substrate 220. The pixel structure 270 is disposed on the first surface 210a of the first substrate 210. The transparent conductive layer 230, the black matrix layer 242, the color filter layer 241 and the over-coating layer 250 are sequentially disposed on the first surface 220a of the second substrate 220. For simplification, only the pixel structure 270 on the first substrate 210 is illustrated in FIG. 2A, and not all units (e.g. may further including an alignment film, a polarizer, etc.) are illustrated in FIG. 2B.

As shown in FIG. 2A and FIG. 2B, a gate line 281 and a data line 282 are disposed on the first surface 210a of the first substrate 210, and they intersect to form a unit pixel region. Note that only one pixel structure 270 formed in the unit pixel region is illustrated in FIG. 2A and FIG. 2B, but in the embodiment, the display panel 200 includes multiple pixel structures 270 formed respectively in different unit pixel regions. The pixel structure 270 includes a thin film transistor 271, a pixel electrode 272 and a common electrode 273. The thin film transistor 271 has a drain electrode 271a electrically connected to the pixel electrode 272, a source electrode 271b electrically connected to the data line 282, and a gate electrode 271c electrically connected to the gate line 281. A gate insulation layer 280 is formed between the gate electrode 271c and a semiconductor layer 271d. The common electrode 273 is disposed above the pixel electrode 272, and an insulation layer 290 is disposed between the pixel electrode 272 and the common electrode 273. In other words, the insulation layer 290 is disposed on the thin film transistor 271 and the pixel electrode 272, and the common electrode 273 is disposed on the insulation layer 290. The common electrode 273 has multiple slits 273s. The pixel electrode 272 is a plate structure without slits. When a voltage difference occurs between the pixel electrode 272 and the common electrode 273, a transverse (horizontal) electric field is generated between the pixel electrode 272 and the common electrode 273 to orient a liquid crystal molecule 260L in the liquid crystal layer 260. People in the art should be able to understand the operation principle of the transverse-electric-field type display panel, and therefore the detail will not be described herein.

The transparent conductive layer 230 is disposed on the first surface 220a of the second substrate 220 and has a first surface 230a facing the first substrate 210 and a second surface 230b facing the second substrate 220. The transparent conductive layer 230 is used for shielding the display panel 200 from the electromagnetic interference (EMI) so that the vision effect would not be affected. The transparent conductive layer 230 is also used to remove electrostatic charges on the second substrate 220 to avoid the accumulation of the electrostatic charges on the display panel 200, which may result in the damage of the components of the display panel 200 or an unexpected orientation of the liquid crystal molecule 260L affecting the display performance. The material of the transparent conductive layer 230 may include indium tin oxide (ITO), indium zinc oxide (IZO), antimony tin oxide (ATO), fluorine tin oxide (FTO) or other conductive and transparent material.

The color filter layer 241 and the black matrix layer 242 are disposed on the first surface 230a of the transparent conductive layer 230. The color filter layer 241 includes multiple regions with respect to different colors (e.g. red, green and blue) to correspond to different unit pixel regions. The black matrix layer 242 is disposed corresponding to the thin film transistor 271, the gate line 281, the data line 282 or other opaque regions, but the invention is not limited thereto. The black matrix layer 242 may be called light shielding layer. A material of the black matrix layer 242 is, for example, black resin. However, the invention is not limited thereto, and in other embodiments, the material of the black matrix layer 242 can also be other light-shielding materials.

The over-coating layer 250 is disposed between the color filter layer 241/black matrix layer 242 and the liquid crystal layer 260. A surface 241a of the color filter layer 241 and a surface 242a of the black matrix layer 242 facing the liquid crystal layer 260 have uneven structures, and therefore the over-coating layer 250 has a planar surface 250a for planarization to avoid irregular inclined angles of the liquid crystal molecule 260L in the liquid crystal layer 260 caused by the uneven structures.

In the embodiment of FIG. 2B, the transparent conductive layer 230 is disposed between the second substrate 220 and the color filter layer 241/black matrix layer 242, but the invention is not limited thereto. If the transparent conductive layer 230 is disposed between the second substrate 220 and the liquid crystal layer 260, it provides the functions of shielding for EMI and discharging the electrostatic charges.

Figure 2C:
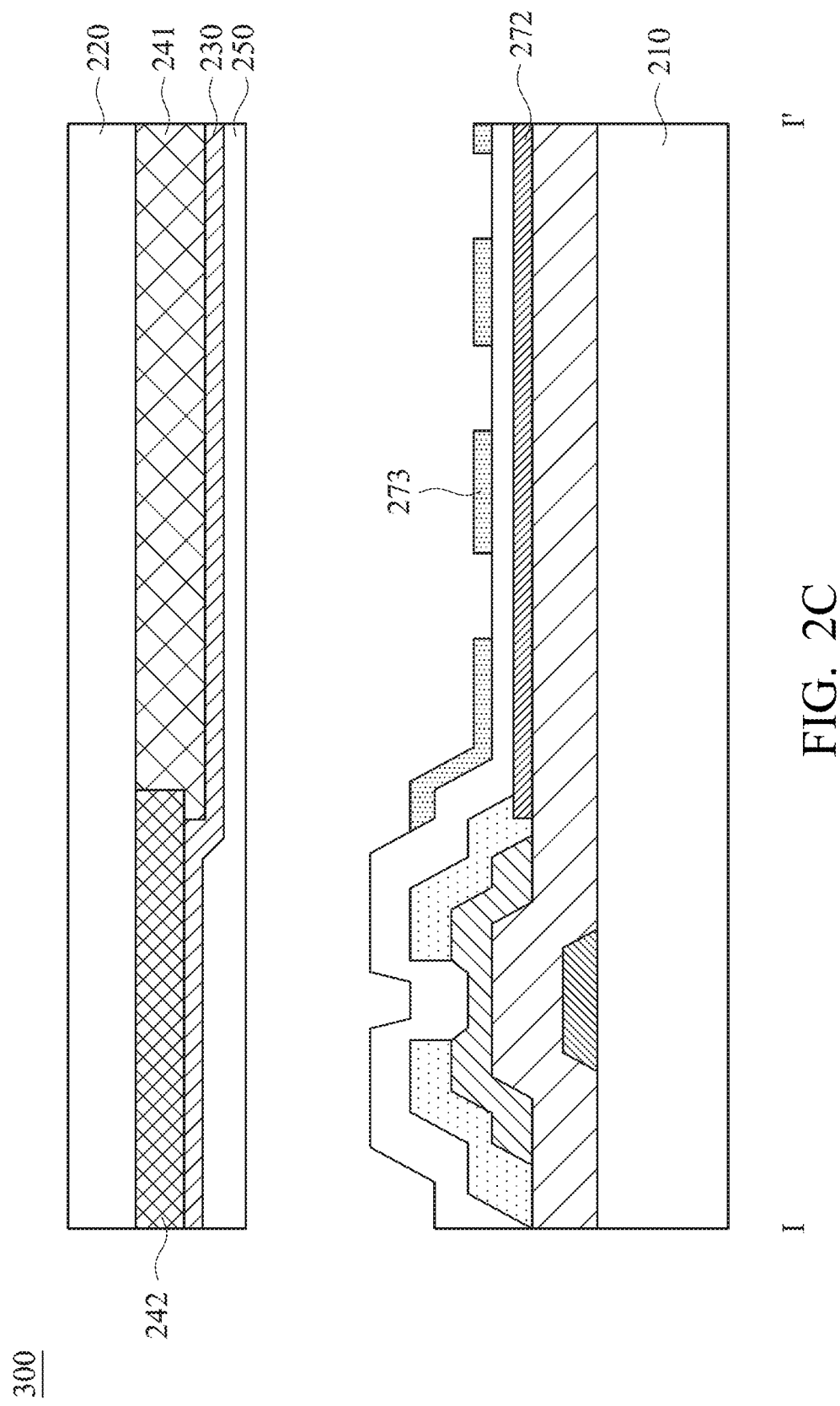
Figure 2D:
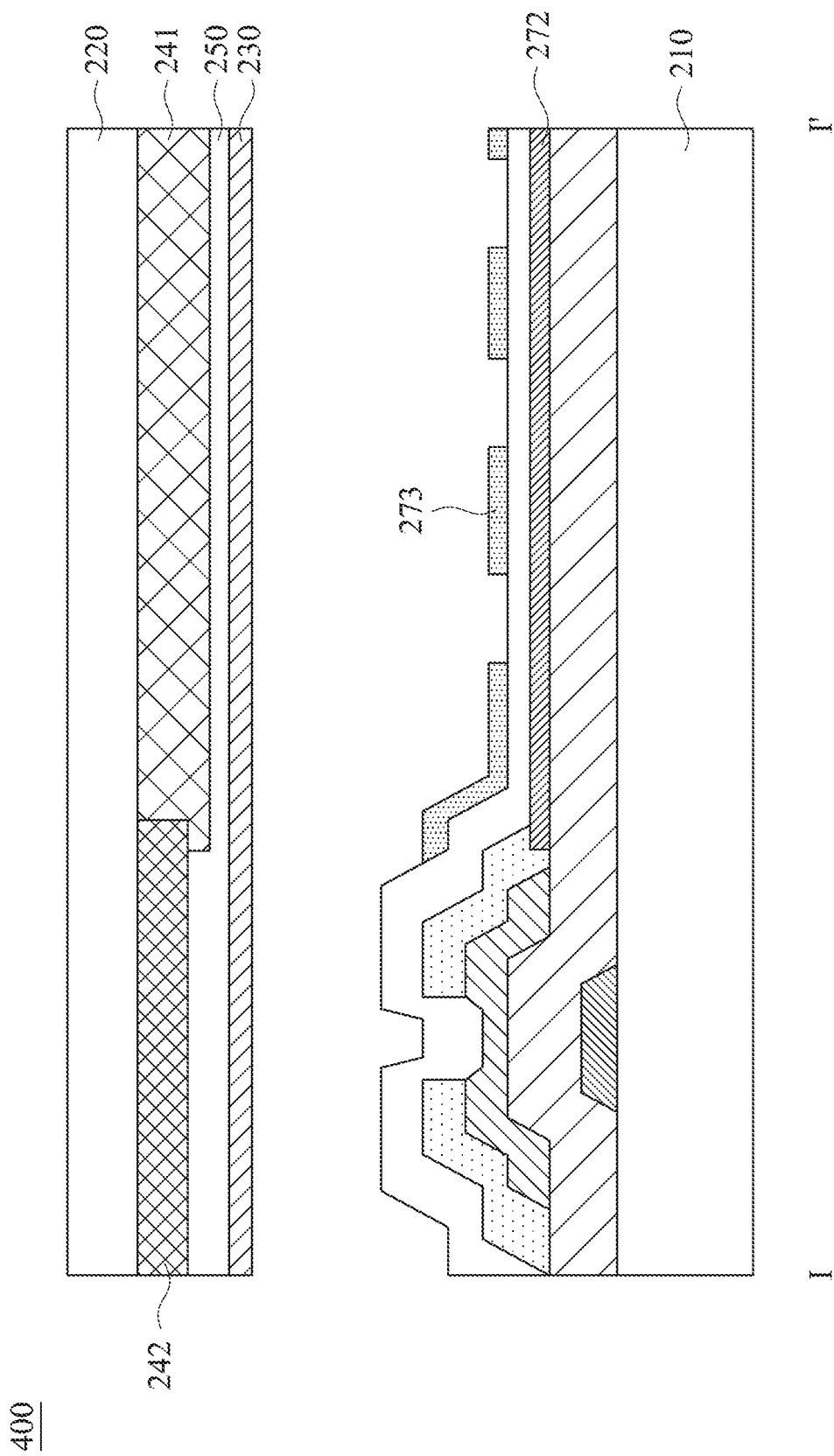

For example, in the embodiment of FIG. 2C, a display panel 300 includes the transparent conductive layer 230 disposed between the color filter layer 241/black matrix layer 242 and the over-coating layer 250. In the embodiment of FIG. 2D, a display panel 400 includes the transparent conductive layer 230 disposed between the over-coating layer 250 and the liquid crystal layer 260. The difference between FIG. 2B, FIG. 2C and FIG. 2C is that the sequences of the color filter layer 241/black matrix layer 242, the transparent conductive layer 230 and the over-coating layer 260 stacked on the second substrate 220 are different. In the embodiments of FIG. 2C and FIG. 2D, the structure of the thin film transistor 271 and the connection between the thin film transistor 271 and the pixel electrode 272 are the same with that in the embodiment of FIG. 2B. Therefore, the thin film transistor 271 is not labeled in FIG. 2C and FIG. 2D, and the structure of the thin film transistor 271, the connection between the thin film transistor 271 and the pixel electrode 272 will not be repeated for simplification. In addition, the top view of the pixel structure in FIG. 2C and FIG. 2D may be referred to FIG. 2A. The aforementioned different embodiments would affect the transmittance (i.e. light transmittance, abbreviated to transmittance herein) of the display panels 200, 300 and 400 differently. The type (e.g. positive or negative) of the liquid crystal molecule 260L would also affect the orientation of the liquid crystal molecule 260L relative to the electric field. Therefore, the influence over the transmittance is discussed with respect to the positive liquid crystal (LC) and negative LC.

Figure 1:
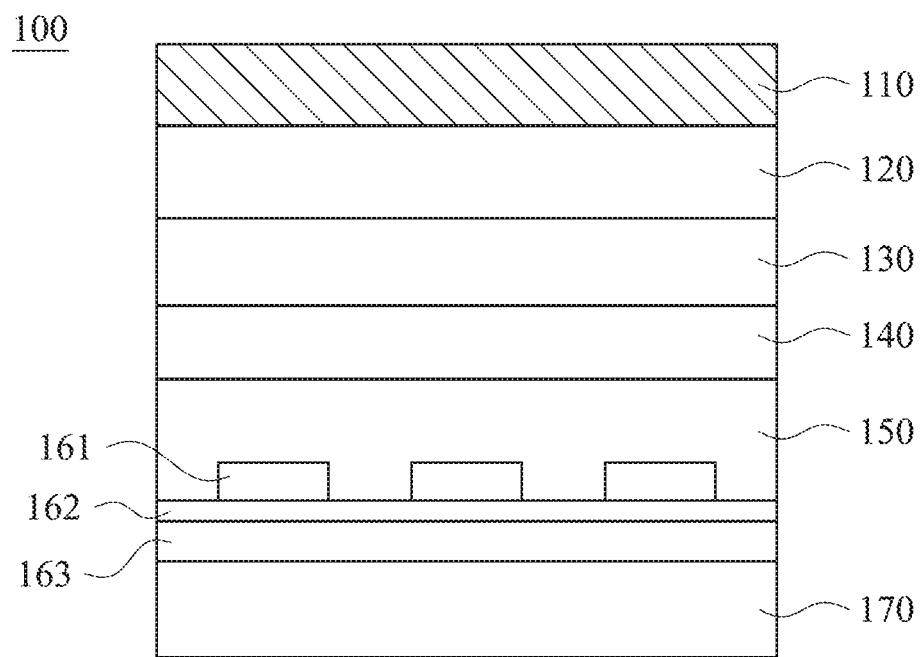
FIG. 1 is a diagram illustrating a cross-sectional view of a conventional transverse-electric-field type display panel.
Figure 3A:
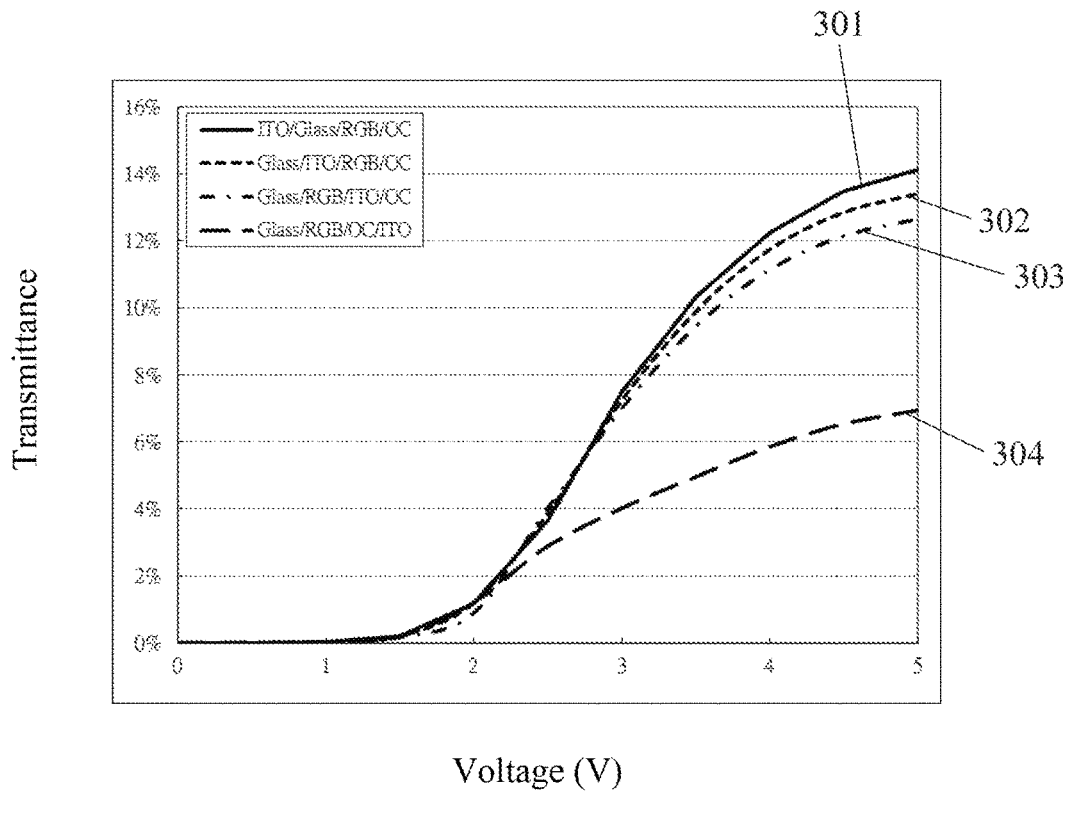
FIG. 3A and FIG. 3B are diagrams illustrating curves of the transmittance with respect to voltages in different embodiments.
Figure 3B:
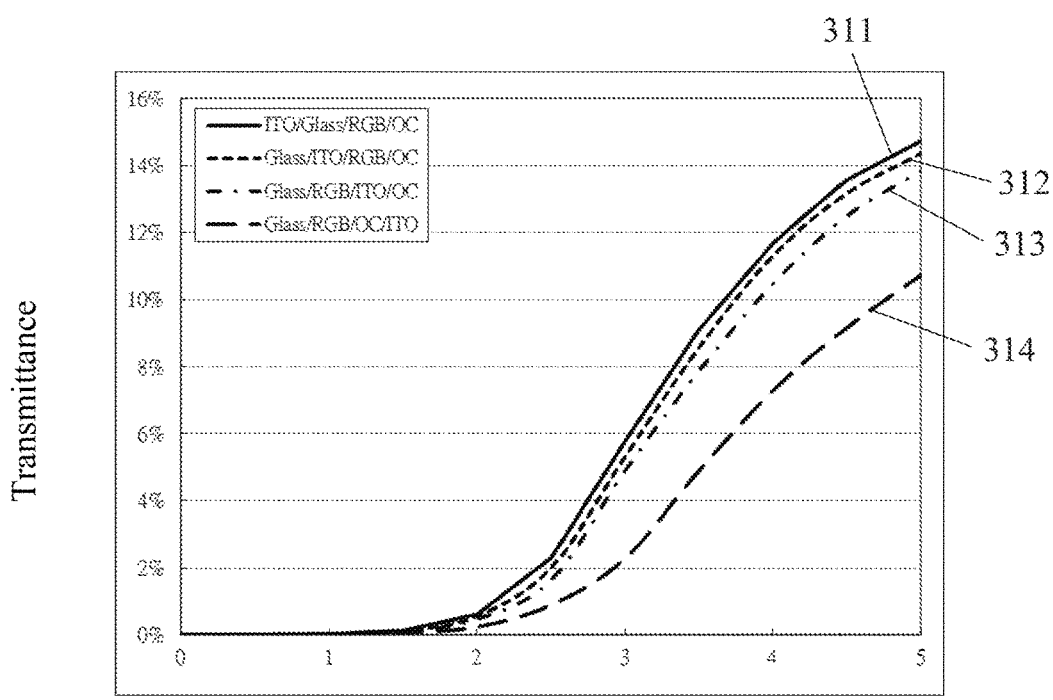

FIG. 3A is a diagram illustrating curves of the transmittance with respect to voltages in different embodiments. FIG. 3A illustrates curves of transmittance of the display panel having positive LC, in which the horizontal axis represents a pixel voltage and the vertical axis represents the transmittance of the display panel. There are four curves 301-304 in FIG. 3A representing the conventional art in FIG. 1 and the embodiments of FIG. 2B to FIG. 2D respectively. The curves 301-304 have different labels in accordance with the disposition sequence of the second substrate, the transparent conductive layer, the color filter layer and the over-coating layer from top to down. To be specific, the curve 301 corresponding to the FIG. 1 is labeled as "ITO/Glass/RGB/OC"; the curve 302 corresponding to FIG. 2B is labeled as "Glass/ITO/RGB/OC"; the curve 303 corresponding to FIG. 2C is labeled as "Glass/RGB/ITO/OC"; and the curve 304 corresponding to FIG. 2D is labeled as "Glass/RGB/OC/ITO". As shown in FIG. 3A, the transmittance represented by the curve 302 is slightly lower than that of the curve 301, the transmittance represented by the curve 303 is slightly lower than that of the curve 302, and the transmittance represented by the curve 304 significantly drops relative to the curves 301-303. In the conventional art of FIG. 1, the transparent conductive layer is disposed on the surface of the second substrate opposite to the liquid crystal layer, and therefore the distance between the transparent conductive layer and the pixel electrode is equal to the summation of the thicknesses of the second substrate, the color filter layer, the over-coating layer, the liquid crystal layer and the insulation layer. However, the distance between the transparent conductive layer 230 and the pixel electrode 272 is equal to the summation of the thicknesses of the color filter layer 241, the over-coating layer 250, the liquid crystal layer 260 and the insulation layer 290 in the embodiment of FIG. 2B, and is equal to the summation of the thicknesses of the over-coating layer 250, the liquid crystal layer 260, and insulation layer 290 in the embodiment of FIG. 2C, and is equal to the summation of the thicknesses of the liquid crystal layer 260 and the insulation layer 290 in the embodiment of FIG. 2D. The vertical electric field between the transparent conductive layer 230 and the pixel electrode 272 is proportional to the voltage difference between the transparent conductive layer 230 and the pixel electrode 272 divided by the distance between the transparent conductive layer 230 and the pixel electrode 272, and therefore the vertical electric fields between the transparent conductive layer 230 and the pixel electrode 272 in FIG. 1 and FIG. 2B to FIG. 2D have a relation of FIG. 2D>FIG. 2C>FIG. 2B>FIG. 1. The liquid crystal molecule 260L is driven by the transverse electric field between the pixel electrode 272 and the common electrode 273 to control the transmittance of the display panels in the embodiments of FIG. 1, FIGS. 2B-2D, and therefore when the vertical electric field between the transparent conductive layer 230 and the pixel electrode 272 is too large, it would cause an unexpected orientation of the liquid crystal molecule 260L and thus the transmittance drops. FIG. 3B is a diagram illustrating curves of the display panel having negative LC. Curve 311-314 correspond to the conventional art in FIG. 1, and the embodiments of FIG. 2B to FIG. 2D respectively. Similarly, the transmittance represented by the curve 312 is slightly lower than that by the curve 311, the transmittance represented by the curve 313 is slightly lower than that by the curve 312, and the transmittance represented by the curve 314 significantly drops relative to the curves 311-103. It is known from FIGS. 3A and 3B that the transmittance just slightly drops compared with the conventional art no matter the transparent conductive layer 230 is disposed between the second substrate 220 and the color filter layer 241 or disposed between the color filter layer 241 and the over-coating layer 250, and no matter positive LC or negative LC is used. Note that the voltage between the transparent conductive layer 230 and the common electrode 273 is 0V in the embodiments of FIG. 3A and FIG. 3B.

Referring to FIG. 2B to FIG. 2D, how the voltage of the transparent conductive layer 230 is determined will be described below. Basically, the electric field between the common electrode 273 and the pixel electrode 272 determines the orientation of the liquid crystal molecule 260L. For example, when the common electrode 273 and the pixel electrode 272 have the same voltage (i.e. the voltage difference between the common electrode 273 and the pixel electrode 272 is equal to 0), the light will be blocked by the polarizer, and thus the display panel 200 is in a dark state (i.e. color of black is shown). In contrast, when an absolute voltage difference between the common electrode 273 and the pixel electrode 272 is maximized, the orientation of the liquid crystal molecule 260L would maximize the light passing through the polarizer, and thus the display panel 200 is in a bright state. The brightness of the display panel 200 in the bright state divided by the brightness in the dark state is referred to as contrast ratio (CR). Note that when a voltage difference occurs between the transparent conductive layer 230 and the pixel electrode 272 or the common electrode 273, the vertical electric field occurs between the transparent conductive layer 230 and the pixel electrode 272 or the common electrode 273, and the electric field may affect the orientation of the liquid crystal molecule 260L and affect the transmittance and the contrast ratio. In the invention, the voltage of the transparent conductive layer 230 is set to be in a particular range so that the display panel 200 has better CR and/or transmittance. Experimental data is provided below.

The transmittance is first discussed. Three embodiments show shown in the following Table 1. In the first embodiment, the voltage of the common electrode 273 is 1 volts (V), and the voltage of the pixel electrode 272 is in a range from 1V to 6V. In the second embodiment, the voltage of the common electrode 273 is 0V, and the voltage of the pixel electrode 272 is in a range from 0V to 5V. In the third embodiment, the voltage of the common electrode 273 is −1V, and the voltage of the pixel electrode 272 is in a range from −1V to 4V. The three embodiments have one thing in common that the voltage difference between the common electrode 273 and the pixel electrode 272 is 0V in the dark state, and the absolute voltage difference between the common electrode 273 and the pixel electrode 272 is 5V in the bright state. However, the absolute voltage difference between the common electrode 273 and the pixel electrode 272 in the bright state may be 4V, 6V or other values in other embodiments.

TABLE 1

| common electrode | pixel electrode |
| --- | --- |
| 1 V | 1 V-6 V |
| 0 V | 0 V-5 V |
| −1 V | −1 V-4 V |

If the voltage of the transparent conductive layer 230 has three possibilities of −1V, 0V and 1V, and the three embodiments of Table 1 are also considered, then the voltage difference between the transparent conductive layer 230 and the common electrode 273 would have 9 embodiments as shown in the following Table 2.

TABLE 2

| Voltage of transparent conductive layer minus voltage of the pixel electrode | | | | |
| --- | --- | --- | --- | --- |
| common electrode | maximum pixel electrode (bright state) | transparent conductive layer | | |
| | | −1 V | 0 V | 1 V |
| −1 V | 4 V | −5 V | −4 V | −3 V |
| 0 V | 5 V | −6 V | −5 V | −4 V |
| 1 V | 6 V | −7 V | −6 V | −5 V |

For example, if the third embodiment of Table 1 is adopted and the voltage of the transparent conductive layer is −1V, then the voltage of the transparent conductive layer 230 minus the voltage of the pixel electrode 272 is −1−4=−5(V), and so on. In Table 2, the voltage difference between the transparent conductive layer 230 and the pixel electrode 272 has maximum of −3V and minimum of −7V. In general, when the absolute voltage difference between the transparent conductive layer 230 and the pixel electrode 272 gets larger, the liquid crystal molecule 260L between the transparent conductive layer 230 and the pixel electrode 272 would be affected by the vertical electric field between the transparent conductive layer 230 and the pixel electrode 272 more seriously, and thus the transmittance drops. Therefore, the larger the absolute voltage difference between the transparent conductive layer 230 and the pixel electrode 272 is, the lower the transmittance of the display panel is. That is to say, the smaller the absolute voltage difference is, the higher the transmittance is. In Table 2, the best transmittance occurs when the voltage of the transparent conductive layer 230 is 1V and the voltage of the common electrode 273 is −1V; and the worst transmittance occurs when the voltage of the transparent conductive layer 230 is −1V and the voltage of the common electrode 273 is 1V. Experimental data will be provided to support the statement.

Figure 4A:
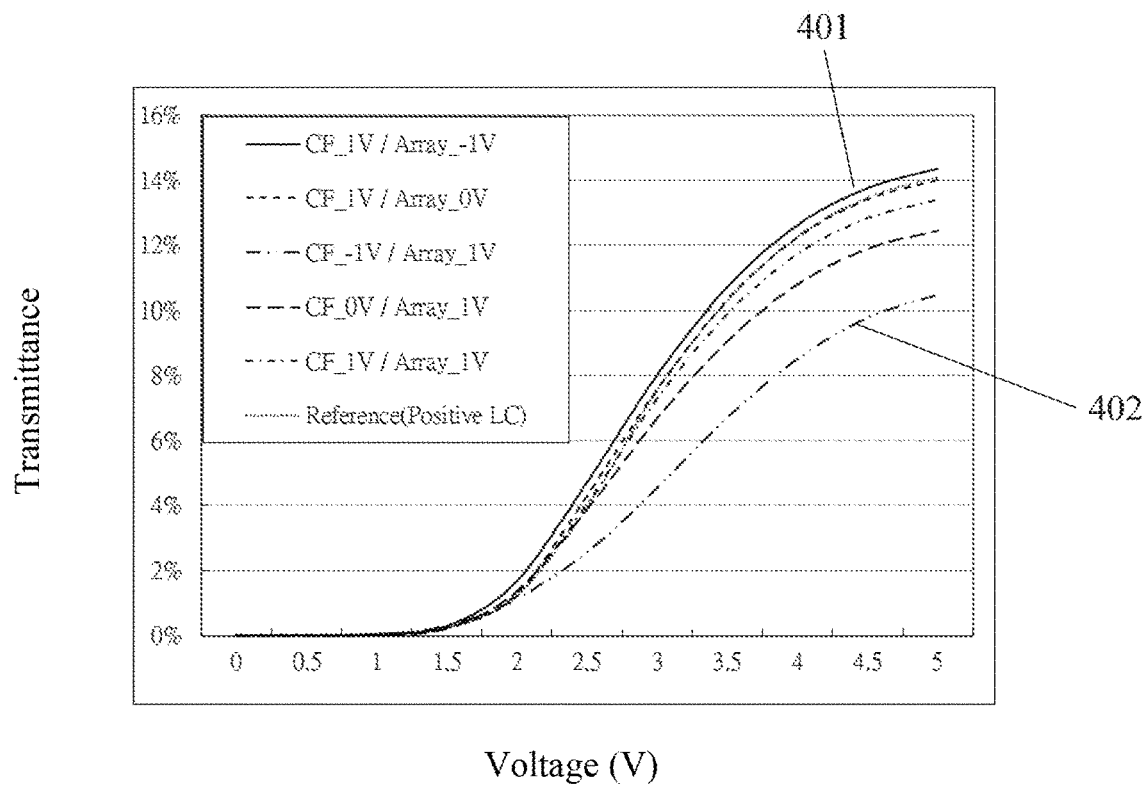
FIG. 4A and FIG. 4B are diagrams illustrating curves of transmittance with respect to different voltages in accordance with the embodiment of FIG. 2B.
Figure 4B:
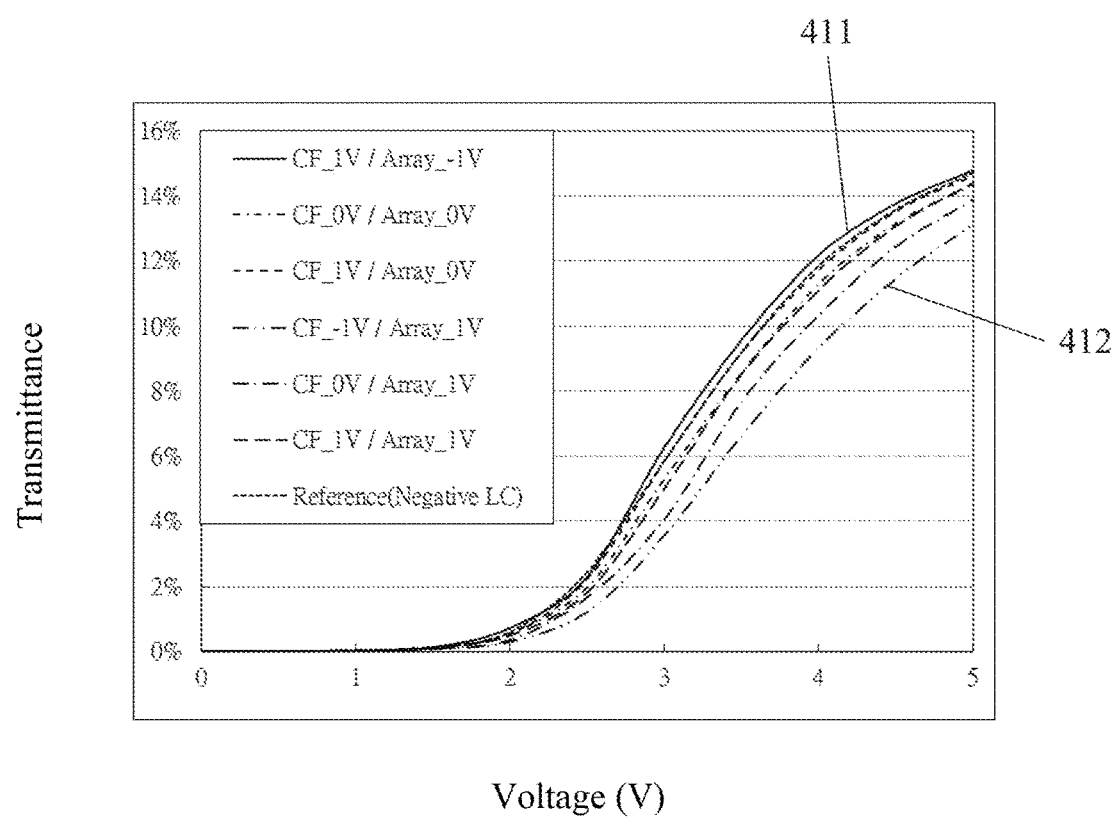

FIG. 4A and FIG. 4B are diagrams illustrating curves of transmittance with respect to different voltages in accordance with the embodiment of FIG. 2B. Referring to FIG. 4A and FIG. 4B, the horizontal axis represents the voltage difference between the pixel electrode 272 and the common electrode 273, the vertical axis represents the transmittance of the display panel. FIG. 4A illustrates the transmittance of the display panel having positive LC, in which the curve labeled as "Reference(Positive LC)" corresponds to the conventional art of FIG. 1. FIG. 4B illustrates the transmittance of the display panel having negative LC, in which the curve labeled as "Reference(Negative LC)" corresponds to the conventional art of FIG. 1. Regarding the other curves, "CF" represents the transparent conductive layer 230 on the second substrate 220, and "Array" represents the common electrode 273 on the first substrate 210. For example, the curve labeled as "CF_1V/Array_−1V" represents the transmittance when the voltage of the transparent conductive layer 230 is 1V and the voltage of the common electrode 273 is −1V, and so on. In FIG. 4A, the curve 401 labeled as "CF_1V/Array_−1V" has the highest transmittance, the curve 402 labeled as "CF_−1V/Array_1V" has the lowest transmittance. In FIG. 4B, the curve 411 labeled as "CF_1V/Array_−1V" has the highest transmittance, and the curve 412 labeled as "CF_−1V/Array_1V" has the lowest transmittance.

Note that as discussed, there are 9 embodiments with respect to the voltages between the transparent conductive layer 230 and the common electrode 273, but not all 9 embodiments are illustrated in FIG. 4A and FIG. 4B for clearly illustrating the curves. Complete data of the 9 embodiments in FIG. 4A is shown in the following Table 3. To be specific, four curves of "CF_−1V/Array_0V", "CF_0V/Array_0V", "CF_0V/Array_−1V", and "CF_−1V/Array_−1V" are omitted in FIG. 4A, but the transmittances represented by the four curves are not higher than curve 401 and not lower than the curve 402. In the following Table 3, the first column represents the voltage difference (i.e. the horizontal axis in FIG. 4A) between the pixel electrode 272 and the common electrode 273, the percentages shown in the table represent the transmittances (i.e. the vertical axis in FIG. 4A), and "CR" represents the contrast ratio. Note that "Substrate_Shielding_BM/RGB_OC" in Table 3 corresponds to the structures of FIG. 2B, and that is, the second substrate 220, the transparent conductive layer 230, the black matrix layer 242/color filter layer 241, and the over-coating layer 250 are disposed from top to down. In other words, the transparent conductive layer 230, the black matrix layer 242/color filter layer 241, and the over-coating layer 250 are sequentially stacked on the second substrate 220.

TABLE 3

| Substrate_shielding_BM/RGB_OC Positive LC | | | |
| --- | --- | --- | --- |
| | CF_−1V/Array_−1V | CF_0V/Array_−1V | CF_−1V/Array_−1V |
| 0 | 0.01% | 0.01% | 0.01% |
| 0.5 | 0.01% | 0.01% | 0.01% |
| 1 | 0.04% | 0.04% | 0.06% |
| 1.5 | 0.22% | 0.22% | 0.30% |
| 2 | 1.15% | 1.36% | 1.67% |
| 2.5 | 4.10% | 4.30% | 4.73% |
| 3 | 7.27% | 7.58% | 8.03% |
| 3.5 | 9.89% | 10.34% | 10.72% |

TABLE 3-continued

Substrate_shielding_BM/RGB_OC Positive LC

| | | | |
|---|---|---|---|
| 4 | 11.72% | 12.23% | 12.62% |
| 4.5 | 12.84% | 13.41% | 13.77% |
| 5 | 13.40% | 14.02% | 14.36% |
| CR | 1341.012193 | 1402.389166 | 1431.806766 |

| | CF_-1V/Array_0V | CF_0V/Array_0V | CF_1V/Array_0V |
|---|---|---|---|
| 0 | 0.01% | 0.01% | 0.01% |
| 0.5 | 0.01% | 0.01% | 0.01% |
| 1 | 0.03% | 0.04% | 0.04% |
| 1.5 | 0.24% | 0.21% | 0.24% |
| 2 | 1.37% | 1.22% | 1.27% |
| 2.5 | 3.91% | 3.86% | 4.30% |
| 3 | 6.69% | 7.25% | 7.58% |
| 3.5 | 9.06% | 9.89% | 10.31% |
| 4 | 10.78% | 11.73% | 12.23% |
| 4.5 | 11.88% | 12.85% | 13.41% |
| 5 | 12.43% | 13.40% | 14.01% |
| CR | 1243.269261 | 1340.573503 | 1401.168337 |

| | CF_-1V/Array_1V | CF_0V/Array_1V | CF_1V/Array_1V |
|---|---|---|---|
| 0 | 0.01% | 0.01% | 0.01% |
| 0.5 | 0.01% | 0.01% | 0.01% |
| 1 | 0.04% | 0.03% | 0.03% |
| 1.5 | 0.31% | 0.24% | 0.21% |
| 2 | 1.14% | 1.37% | 1.23% |
| 2.5 | 2.57% | 3.89% | 4.06% |
| 3 | 4.54% | 6.68% | 7.30% |
| 3.5 | 6.70% | 9.06% | 9.88% |
| 4 | 8.50% | 10.78% | 11.72% |
| 4.5 | 9.79% | 11.88% | 12.84% |
| 5 | 10.46% | 12.44% | 13.40% |
| CR | 1042.893569 | 1244.325284 | 1340.515467 |

On the other hand, complete data of the 9 embodiments in FIG. 4B is shown in the following Table 4. Three curves of "CF_-1V/Array_0V", "CF_-1V/Array_-1V" and "CF_0V/Array_-1V" are omitted in FIG. 4B. Similarly, the transmittances represented by the omitted three curves are not higher than the curve 411, and not lower than the curve 412. The drawing principle for Table 4 is similar to that of Table 3, and therefore will not be repeated.

TABLE 4

Substrate_Shielding_BM/RGB_OC Negative LC

| | CF_-1V/Array_-1V | CF_0V/Array_-1V | CF_1V/Array_-1V |
|---|---|---|---|
| 0 | 0.01% | 0.01% | 0.01% |
| 0.5 | 0.01% | 0.01% | 0.01% |
| 1 | 0.02% | 0.03% | 0.03% |
| 1.5 | 0.11% | 0.13% | 0.13% |
| 2 | 0.49% | 0.60% | 0.72% |
| 2.5 | 2.16% | 2.48% | 2.31% |
| 3 | 4.91% | 6.01% | 6.27% |
| 3.5 | 8.58% | 9.21% | 9.57% |
| 4 | 11.18% | 11.71% | 12.17% |
| 4.5 | 13.05% | 13.63% | 13.76% |
| 5 | 14.31% | 14.77% | 14.78% |
| CR | 1427.833108 | 1474.010496 | 1474.261726 |

| | CF_-1V/Array_0V | CF_0V/Array_0V | CF_1V/Array_0V |
|---|---|---|---|
| 0 | 0.01% | 0.01% | 0.01% |
| 0.5 | 0.01% | 0.01% | 0.01% |
| 1 | 0.02% | 0.03% | 0.03% |
| 1.5 | 0.08% | 0.11% | 0.13% |
| 2 | 0.40% | 0.56% | 0.54% |
| 2.5 | 1.69% | 2.00% | 2.24% |
| 3 | 4.19% | 5.31% | 5.86% |
| 3.5 | 7.71% | 8.57% | 9.20% |

TABLE 4-continued

Substrate_Shielding_BM/RGB_OC Negative LC

| | | | |
|---|---|---|---|
| 4 | 10.47% | 11.30% | 11.73% |
| 4.5 | 12.46% | 13.16% | 13.54% |
| 5 | 13.90% | 14.35% | 14.63% |
| CR | 1386.627666 | 1431.761898 | 1459.608408 |

| | CF_-1V/Array_1V | CF_0V/Array_1V | CF_1V/Array_1V |
|---|---|---|---|
| 0 | 0.01% | 0.01% | 0.01% |
| 0.5 | 0.01% | 0.01% | 0.01% |
| 1 | 0.02% | 0.02% | 0.02% |
| 1.5 | 0.07% | 0.09% | 0.11% |
| 2 | 0.29% | 0.35% | 0.48% |
| 2.5 | 1.23% | 1.68% | 1.83% |
| 3 | 3.57% | 4.07% | 5.02% |
| 3.5 | 6.64% | 7.68% | 8.53% |
| 4 | 9.35% | 10.35% | 11.12% |
| 4.5 | 11.49% | 12.45% | 13.08% |
| 5 | 13.14% | 13.89% | 14.41% |
| CR | 1309.935512 | 1385.698556 | 1437.979453 |

Figure 5A:
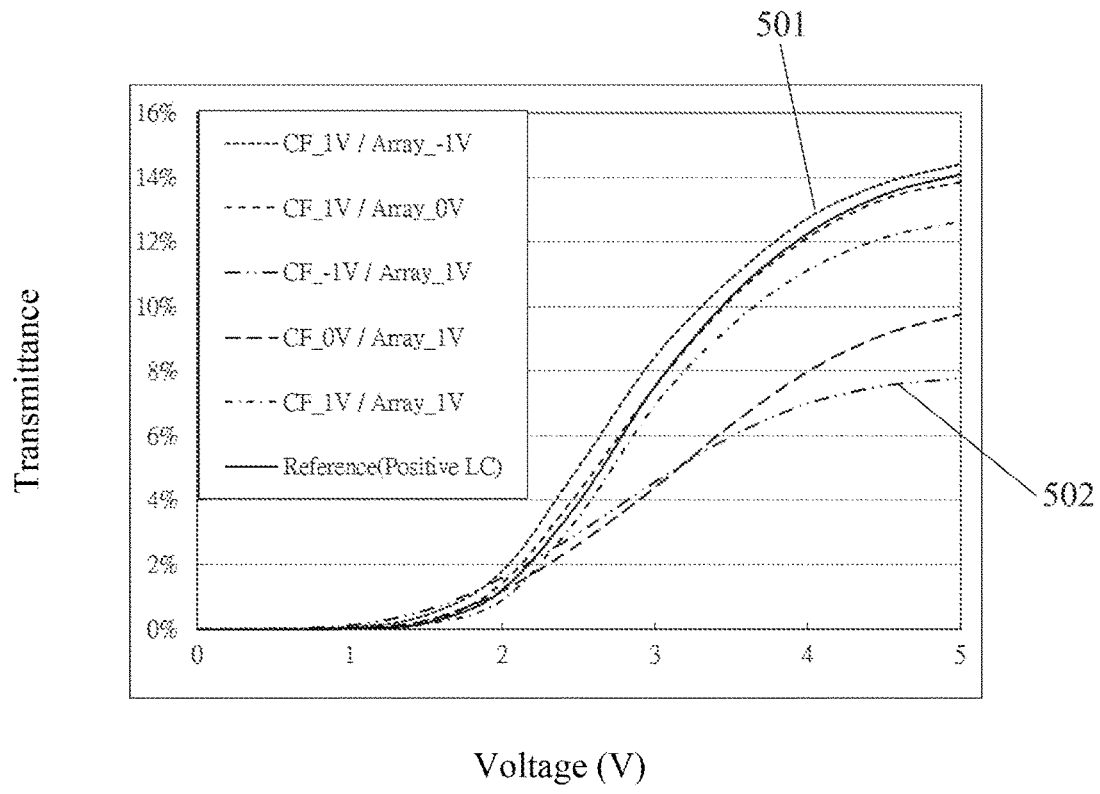
FIG. 5A and FIG. 5B are diagrams illustrating curves of transmittance with respect to different voltages in accordance with the embodiment of FIG. 2C.
Figure 5B:
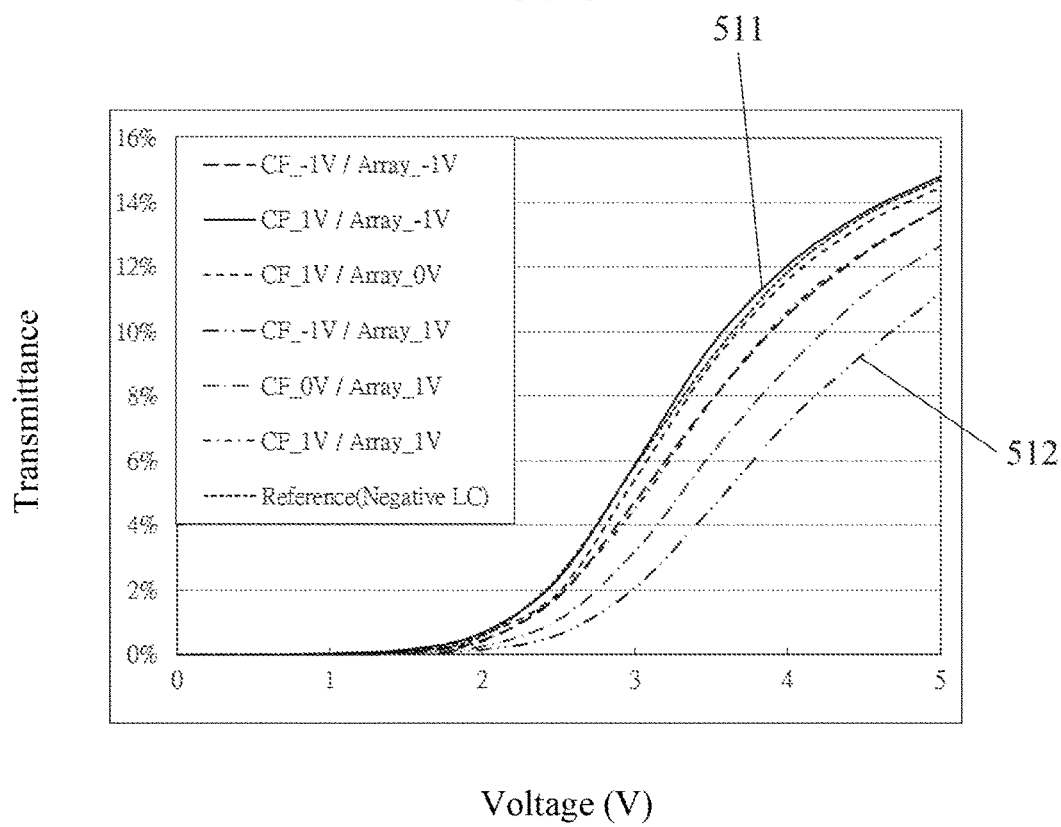

FIG. 5A and FIG. 5B are diagrams illustrating curves of transmittance with respect to different voltages in accordance with the embodiment of FIG. 2C. FIG. 5A illustrate the transmittance of the display panel having positive LC, and FIG. 5B illustrates the transmittance of the display panel having negative LC. In FIG. 5A, the curve 501 labeled as "CF_1V/Array_-1V" has the highest transmittance, and the curve 502 labeled as "CF_-1V/Array_1V" has the lowest transmittance. In FIG. 5B, the curve 511 labeled as "CF_1V/Array_-1V" has the highest transmittance, the curve 512 labeled as "CF_-1V/Array_1V" has the lowest transmittance.

Similarly, not all 9 embodiments are illustrated in FIG. 5A, and complete data of the 9 embodiments is shown in the following Table 5. To be specific, four curves of "CF_-1V/Array_0V", "CF_0V/Array_-1V", "CF_0V/Array_0V" and "CF_-1V/Array_-1V" are omitted in FIG. 5A, but the transmittances represented by the four omitted curves are not higher than the curve 501 and not lower than the curve 502. Similarly, "Substrate_BM/RGB_Shielding_OC" in Table 5 corresponds to the structure of FIG. 2C, that is, the second substrate 220, the black matrix layer 242/color filter layer 241, the transparent conductive layer 230, and the over-coating layer 250 are disposed from top to down.

TABLE 5

Substrate_BM/RGB Shielding_OC Positive LC

| | CF_-1V/Array_-1V | CF_0V/Array_-1V | CF_1V/Array_-1V |
|---|---|---|---|
| 0 | 0.01% | 0.01% | 0.01% |
| 0.5 | 0.01% | 0.01% | 0.02% |
| 1 | 0.03% | 0.04% | 0.08% |
| 1.5 | 0.18% | 0.25% | 0.46% |
| 2 | 1.02% | 1.19% | 1.81% |
| 2.5 | 4.03% | 4.26% | 5.07% |
| 3 | 7.02% | 7.60% | 8.47% |
| 3.5 | 9.45% | 10.23% | 10.87% |
| 4 | 11.13% | 12.13% | 12.73% |
| 4.5 | 12.13% | 13.31% | 13.83% |
| 5 | 12.64% | 13.87% | 14.40% |
| CR | 1264.232586 | 1387.109964 | 1390.092671 |

TABLE 5-continued

Substrate_BM/RGB Shielding_OC Positive LC

| | CF_-1V/<br>Array_0V | CF_0V/<br>Array_0V | CF_1V/<br>Array_0V |
|---|---|---|---|
| 0 | 0.01% | 0.01% | 0.01% |
| 0.5 | 0.01% | 0.01% | 0.01% |
| 1 | 0.04% | 0.03% | 0.04% |
| 1.5 | 0.29% | 0.18% | 0.22% |
| 2 | 1.19% | 0.91% | 1.45% |
| 2.5 | 2.64% | 4.01% | 4.29% |
| 3 | 4.40% | 7.01% | 7.55% |
| 3.5 | 6.23% | 9.45% | 10.24% |
| 4 | 7.98% | 11.12% | 12.13% |
| 4.5 | 9.14% | 12.13% | 13.33% |
| 5 | 9.76% | 12.64% | 13.85% |
| CR | 976.1700288 | 1264.281548 | 1384.638076 |

| | CF_-1V/<br>Array_1V | CF_0V/<br>Array_1V | CF_1V/<br>Array_1V |
|---|---|---|---|
| 0 | 0.01% | 0.01% | 0.01% |
| 0.5 | 0.02% | 0.01% | 0.01% |
| 1 | 0.13% | 0.04% | 0.03% |
| 1.5 | 0.60% | 0.28% | 0.18% |
| 2 | 1.60% | 1.19% | 0.93% |
| 2.5 | 3.01% | 2.64% | 3.51% |
| 3 | 4.58% | 4.41% | 6.97% |
| 3.5 | 6.00% | 6.35% | 9.43% |
| 4 | 7.01% | 8.00% | 11.12% |
| 4.5 | 7.57% | 9.16% | 12.13% |
| 5 | 7.80% | 9.78% | 12.63% |
| CR | 752.5104514 | 977.6306232 | 1263.689167 |

On the other hand, complete data of FIG. 5B is shown in the following Table 6. Three curves of "CF_-1V/Array_0V", "CF_0V/Array_-1V", and "CF_0V/Array_0V" are omitted in FIG. 5B, and the transmittances represented by the three omitted curves are not higher than the curve 511 and not lower than the curve 512.

TABLE 6

Substrate_BM/RGB_Shielding_OC Negative LC

| | CF_-1V/<br>Array_-1V | CF_0V/<br>Array_-1V | CF_1V/<br>Array_-1V |
|---|---|---|---|
| 0 | 0.01% | 0.01% | 0.01% |
| 0.5 | 0.01% | 0.01% | 0.01% |
| 1 | 0.02% | 0.03% | 0.03% |
| 1.5 | 0.10% | 0.14% | 0.16% |
| 2 | 0.46% | 0.60% | 0.68% |
| 2.5 | 1.84% | 2.31% | 2.37% |
| 3 | 4.76% | 5.93% | 5.90% |
| 3.5 | 7.90% | 9.06% | 9.58% |
| 4 | 10.53% | 11.59% | 12.05% |
| 4.5 | 12.43% | 13.30% | 13.69% |
| 5 | 13.87% | 14.52% | 14.81% |
| CR | 1383.538816 | 1447.943582 | 1473.68574 |

| | CF_-1V/<br>Array_0V | CF_0V/<br>Array_0V | CF_1V/<br>Array_0V |
|---|---|---|---|
| 0 | 0.01% | 0.01% | 0.01% |
| 0.5 | 0.01% | 0.01% | 0.01% |
| 1 | 0.02% | 0.02% | 0.03% |
| 1.5 | 0.07% | 0.10% | 0.13% |
| 2 | 0.30% | 0.47% | 0.65% |
| 2.5 | 1.19% | 1.64% | 1.97% |
| 3 | 3.30% | 4.90% | 5.47% |
| 3.5 | 6.23% | 7.87% | 9.03% |
| 4 | 8.95% | 10.47% | 11.60% |
| 4.5 | 11.03% | 12.50% | 13.34% |
| 5 | 12.79% | 13.84% | 14.47% |
| CR | 1276.110283 | 1380.490266 | 1443.912643 |

TABLE 6-continued

Substrate_BM/RGB_Shielding_OC Negative LC

| | CF_-1V/<br>Array_1V | CF_0V/<br>Array_1V | CF_1V/<br>Array_1V |
|---|---|---|---|
| 0 | 0.01% | 0.01% | 0.01% |
| 0.5 | 0.01% | 0.01% | 0.01% |
| 1 | 0.02% | 0.02% | 0.02% |
| 1.5 | 0.05% | 0.07% | 0.10% |
| 2 | 0.17% | 0.27% | 0.43% |
| 2.5 | 0.64% | 1.11% | 1.89% |
| 3 | 2.10% | 3.21% | 4.54% |
| 3.5 | 4.55% | 6.24% | 7.87% |
| 4 | 7.22% | 8.92% | 10.63% |
| 4.5 | 9.35% | 11.15% | 12.47% |
| 5 | 11.21% | 12.67% | 13.85% |
| CR | 1115.696557 | 1263.904208 | 1381.81641 |

Figure 6A:
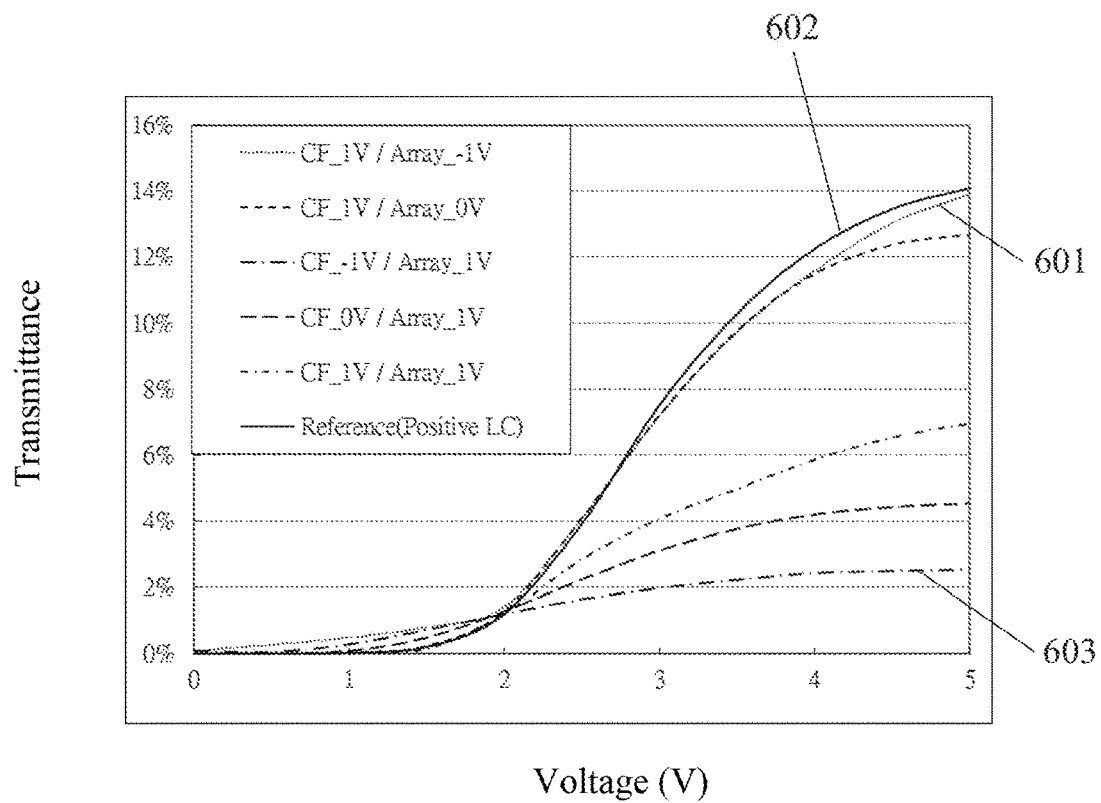
FIG. 6A and FIG. 6B are diagrams illustrating curves of transmittance with respect to different voltages in accordance with the embodiment of FIG. 2D.
Figure 6B:
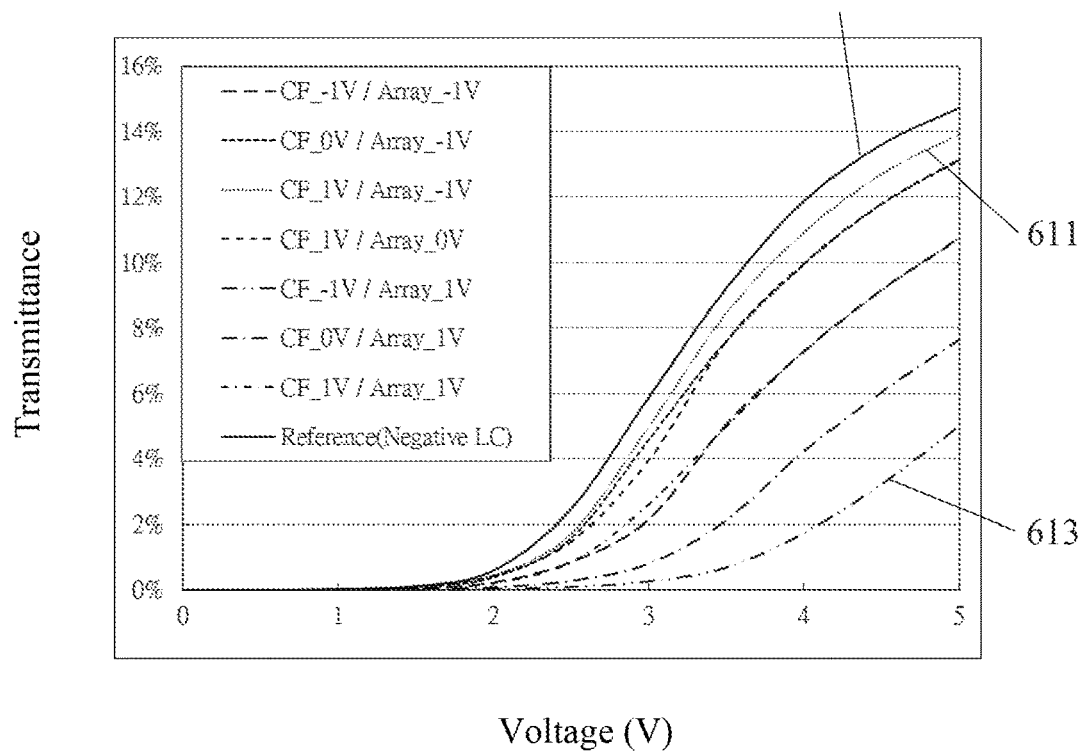

FIG. 6A and FIG. 6B are diagrams illustrating curves of transmittance with respect to different voltages in accordance with the embodiment of FIG. 2D. FIG. 6A illustrates the transmittance of the display panel having positive LC, and FIG. 6B illustrates the transmittance of the display panel having negative LC. In FIG. 6A, except for the reference curve 602, the curve 601 labeled as "CF_1V/Array_-1V" has the highest transmittance, the curve 603 labeled as "CF_-1V/Array_1V" has the lowest transmittance. In FIG. 6B, except for the reference curve 612, the curve 611 labeled as "CF_1V/Array_-1V" has the highest transmittance, and the curve 613 labeled as "CF_-1V/Array_1V" has the lowest transmittance.

Complete data of FIG. 6A is shown in the following Table 7. Four cures of "CF_-1V/Array_0V", "CF_0V/Array_-1V", "CF_0V/Array_0V", and "CF_-1V/Array_-1V" are omitted in FIG. 6A, but the transmittances represented by the four omitted curves are not higher than the curve 601 and not lower than the curve 603. Similarly, "Substrate_BM/RGB_OC_Shielding" in Table 7 corresponds to the structure of FIG. 2D, that is, the second substrate 220, the black matrix layer 242/color filter layer 241, the over-coating layer 250, and the transparent conductive layer 230 are disposed from top to down.

TABLE 7

Substrate_BM/RGB_OC_Shielding Positive LC

| | CF_-1V/<br>Array_-1V | CF_0V/<br>Array_-1V | CF_1V/<br>Array_-1V |
|---|---|---|---|
| 0 | 0.01% | 0.01% | 0.09% |
| 0.5 | 0.01% | 0.01% | 0.28% |
| 1 | 0.03% | 0.05% | 0.50% |
| 1.5 | 0.20% | 0.26% | 0.81% |
| 2 | 1.21% | 1.20% | 1.42% |
| 2.5 | 2.86% | 3.88% | 4.10% |
| 3 | 3.98% | 7.24% | 7.21% |
| 3.5 | 4.95% | 9.80% | 9.76% |
| 4 | 5.85% | 11.50% | 11.59% |
| 4.5 | 6.54% | 12.38% | 13.05% |
| 5 | 6.94% | 12.71% | 13.92% |
| CR | 694.7747569 | 1262.236793 | 160.730722 |

| | CF_-1V/<br>Array_0V | CF_0V/<br>Array_0V | CF_1V/<br>Array_0V |
|---|---|---|---|
| 0 | 0.01% | 0.01% | 0.01% |
| 0.5 | 0.01% | 0.01% | 0.01% |
| 1 | 0.10% | 0.03% | 0.05% |
| 1.5 | 0.50% | 0.20% | 0.25% |
| 2 | 1.29% | 1.22% | 1.29% |
| 2.5 | 2.25% | 2.88% | 4.12% |

TABLE 7-continued

Substrate_BM/RGB_OC_Shielding Positive LC

| 3 | 3.12% | 4.02% | 7.24% |
| 3.5 | 3.78% | 4.95% | 9.80% |
| 4 | 4.21% | 5.85% | 11.50% |
| 4.5 | 4.45% | 6.54% | 12.39% |
| 5 | 4.56% | 6.94% | 12.71% |
| CR | 453.142883 | 694.6411794 | 1263.555208 |

| | CF_-1V/<br>Array_1V | CF_0V/<br>Array_1V | CF_1V/<br>Array_1V |
| --- | --- | --- | --- |
| 0 | 0.09% | 0.01% | 0.01% |
| 0.5 | 0.05% | 0.01% | 0.01% |
| 1 | 0.29% | 0.10% | 0.03% |
| 1.5 | 0.72% | 0.50% | 0.17% |
| 2 | 1.20% | 1.29% | 1.21% |
| 2.5 | 1.64% | 2.25% | 2.86% |
| 3 | 1.98% | 3.12% | 4.08% |
| 3.5 | 2.22% | 3.78% | 4.98% |
| 4 | 2.43% | 4.22% | 5.87% |
| 4.5 | 2.49% | 4.45% | 6.55% |
| 5 | 2.54% | 4.55% | 6.96% |
| CR | 29.27983662 | 452.1263789 | 696.6168194 |

Complete data of FIG. 6B is shown in the following Table 8. Two curves of "CF_0V/Array_0V" and "CF_-1V/Array_-1V" are omitted in the FIG. 6B, but the transmittances represented by the two omitted curves are not higher than the curve 611 and not lower than the curve 613.

TABLE 8

Substrate_BM/RGB_OC_Shielding Negative LC

| | CF_-1V/<br>Array_-1V | CF_0V/<br>Array_-1V | CF_1V/<br>Array_-1V |
| --- | --- | --- | --- |
| 0 | 0.01% | 0.01% | 0.01% |
| 0.5 | 0.01% | 0.01% | 0.01% |
| 1 | 0.02% | 0.03% | 0.03% |
| 1.5 | 0.06% | 0.11% | 0.12% |
| 2 | 0.24% | 0.40% | 0.47% |
| 2.5 | 0.87% | 1.60% | 1.74% |
| 3 | 2.17% | 4.60% | 5.01% |
| 3.5 | 5.07% | 7.63% | 8.49% |
| 4 | 7.30% | 9.96% | 10.93% |
| 4.5 | 9.19% | 11.79% | 12.72% |
| 5 | 10.75% | 13.12% | 13.93% |
| CR | 1072.607216 | 1306.014322 | 1352.012857 |

| | CF_-1V/<br>Array_0V | CF_0V/<br>Array_0V | CF_1V/<br>Array_0V |
| --- | --- | --- | --- |
| 0 | 0.01% | 0.01% | 0.01% |
| 0.5 | 0.01% | 0.01% | 0.01% |
| 1 | 0.01% | 0.02% | 0.03% |
| 1.5 | 0.03% | 0.06% | 0.10% |
| 2 | 0.10% | 0.24% | 0.45% |
| 2.5 | 0.29% | 0.89% | 1.50% |
| 3 | 0.81% | 2.29% | 3.98% |
| 3.5 | 2.13% | 4.89% | 7.61% |
| 4 | 4.03% | 7.29% | 9.98% |
| 4.5 | 6.07% | 9.18% | 11.79% |
| 5 | 7.65% | 10.74% | 13.15% |
| CR | 760.9103357 | 1071.994746 | 1308.602663 |

| | CF_-1V/<br>Array_1V | CF_0V/<br>Array_1V | CF_1V/<br>Array_1V |
| --- | --- | --- | --- |
| 0 | 0.01% | 0.01% | 0.01% |
| 0.5 | 0.01% | 0.01% | 0.01% |
| 1 | 0.01% | 0.01% | 0.02% |
| 1.5 | 0.02% | 0.03% | 0.06% |
| 2 | 0.04% | 0.09% | 0.23% |
| 2.5 | 0.11% | 0.30% | 0.87% |
| 3 | 0.28% | 0.82% | 2.62% |

TABLE 8-continued

Substrate_BM/RGB_OC_Shielding Negative LC

| 3.5 | 0.71% | 2.14% | 5.00% |
| 4 | 1.75% | 4.24% | 7.29% |
| 4.5 | 3.24% | 6.04% | 9.18% |
| 5 | 5.01% | 7.65% | 10.74% |
| CR | 486.447791 | 761.4666732 | 1071.654355 |

Therefore, the best transmittance occurs when the voltage of the transparent conductive layer 230 is 1V and the voltage of the common electrode 273 is −1V (that is, the difference between the voltage of the transparent conductive layer 230 and the maximum voltage of the pixel electrode 272 is −3V); the worst transmittance occurs when the voltage of the transparent conductive layer 230 is −1V and the voltage of the common electrode 273 is 1V (that is, the difference between the voltage of the transparent conductive layer 230 and the maximum voltage of the pixel electrode 272 is −7V) among the 9 embodiments according to the data shown in FIG. 4A, FIG. 4B, FIG. 5A, FIG. 5B, FIG. 6A, FIG. 6B, and Table 3 to Table 8.

Figure 7B:
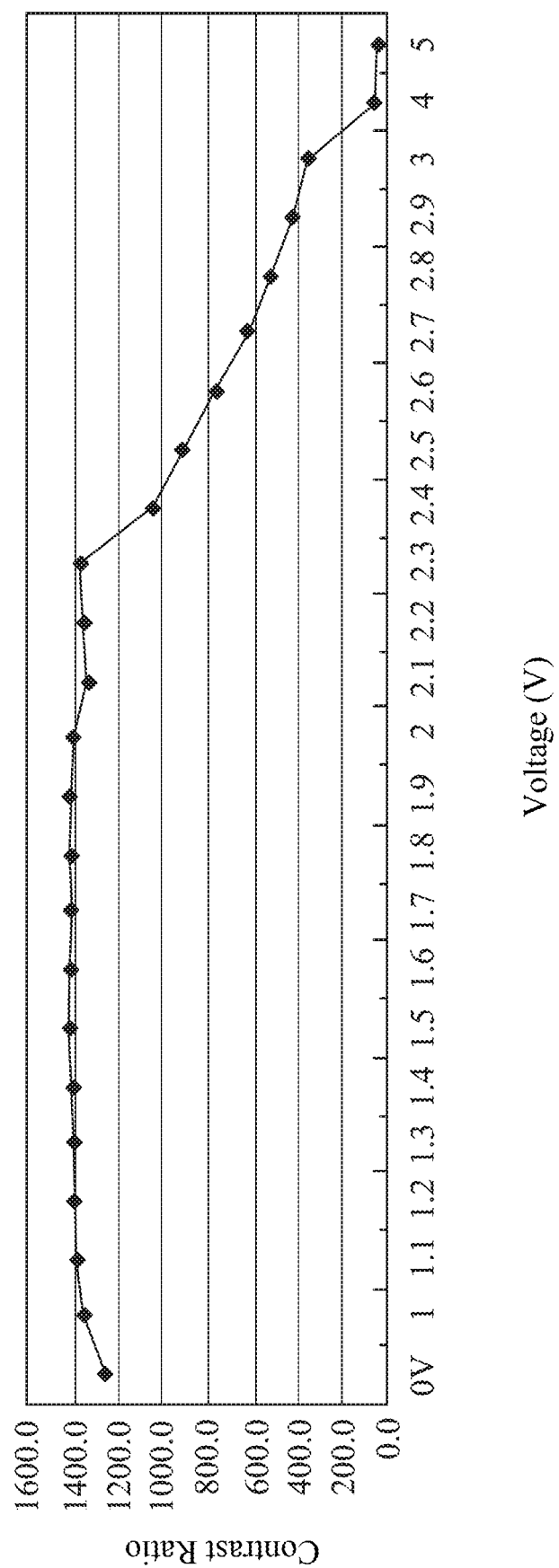
FIG. 7B is a diagram illustrating a curve of contrast ratio with respect to the voltage difference between the transparent conductive layer and the common electrode in accordance with the embodiment of FIG. 7A.
Figure 7D:
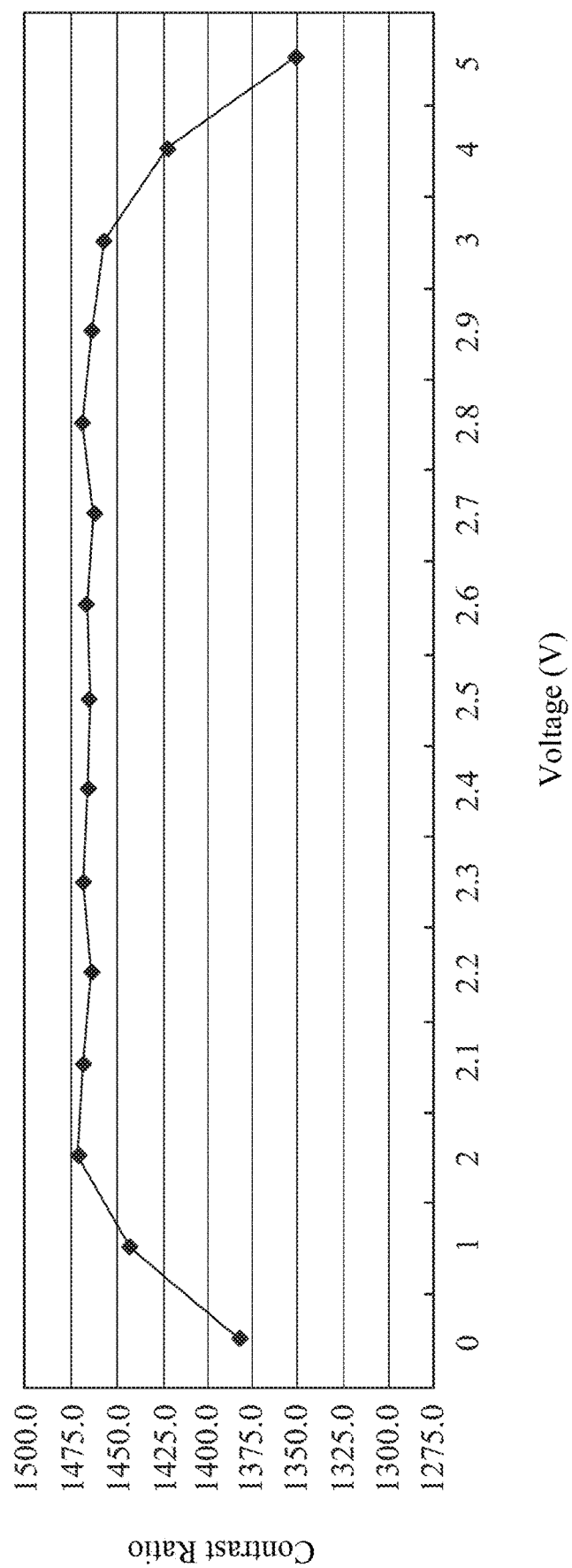
FIG. 7D is a diagram illustrating a curve of contrast ratio with respect to the voltage difference between the transparent conductive layer and the common electrode in accordance with the embodiment of FIG. 7C.

The contrast ratio is discussed herein. Data for the contrast ratio is shown as figures because the tables are too big. Brightness of the display panel is listed in tables of FIG. 7A and FIG. 7C in accordance with the voltage of the transparent conductive layer 230, the pixel electrode 272 and the common electrode 273. The contrast ratio corresponding to FIG. 7A and FIG. 7C are shown in FIG. 7B and FIG. 7D respectively. FIGS. 7A and 7B are for positive LC, and FIG. 7C and FIG. 7D are for negative LC.

Values in the first row of the tables in FIG. 7A and FIG. 7C represents the voltage of the transparent conductive layer 230 minus the voltage of the common electrode 273, and the range is from 0V to 5V; values in the first column represents the voltage of the pixel electrode 272 minus the voltage of the common electrode 273, and the range is from 0V to 5V; other values except for the last row are the brightness of the display panel. When the voltage difference between the pixel electrode 272 and the common electrode 273 is 0V, the display panel is in the dark state, and therefore the brightness of the display panel is relatively low. For example, the brightness in the second row of FIG. 7A is in a range from 0.5 to 13.1. When the voltage difference between the pixel electrode 272 and the common electrode 273 is 5V, the display panel is in the bright state, and therefore the brightness of the display panel is relatively high. For example, the brightness in the second last row of FIG. 7A is in a range from 402 to 722. The contrast ratio, as shown in the last row of FIG. 7A, is calculated by dividing the brightness of the bright state by the brightness of the dark state.

Take the display panel with positive LC as an example, referring to FIG. 7A and FIG. 7B, the vertical axis represent contrast ratio and the horizontal axis represents the voltage difference between the transparent conductive layer 230 and the common electrode 273 in FIG. 7B. When the voltage difference between the transparent conductive layer 230 and the common electrode 273 is 0V (refer to the second column of FIG. 7A), the lowest brightness is 0.499779 (the number is rounded as 0.5 in FIG. 7A), the highest brightness is 631.86 (the number is rounded as 632 in FIG. 7A), and therefore the contrast ratio is 1264. When the voltage difference between the transparent conductive layer 230 and the common electrode 273 is 5V (refer to the last column), the lowest brightness is 13.141548 (the number is rounded as 13.1 in FIG. 7A), the highest brightness is 401.6571 (the number is rounded as 402 in FIG. 7A), and therefore the contrast ratio is 31.

As shown in FIG. 7A and FIG. 7B, when the voltage difference between the transparent conductive layer 230 and the common electrode 273 is greater than 2.3V, the contrast ratio of the display panel with positive LC drops significantly. Therefore, in some embodiment, it is set that the voltage of the transparent conductive layer 230 minus the voltage of the common electrode 273 is greater than or equal to 0V and smaller than or equal to 2.3V (i.e. 0V the voltage of the transparent conductive layer 230 minus the voltage of the common electrode 273<2.3V). In addition, when the voltage difference between the transparent conductive layer 230 and the common electrode 273 is smaller than 1V, the contrast ratio of the display panel slightly drops. Therefore, in some embodiments, it is preferably set that the voltage of the transparent conductive layer 230 minus the voltage of the common electrode 273 is smaller than or equal to 2.3V and greater than or equal to 1V. In some embodiments, it is further set that the voltage of the transparent conductive layer 230 minus the voltage of the common electrode 273 is smaller than or equal to 2V and greater than or equal to 1.4V for further setting a preferred range of contrast ratio. In some embodiments, it is set that the voltage of the transparent conductive layer 230 minus the voltage of the common electrode 273 is equal to 1.7V for maximizing the contrast ratio.

Note that when the display panel operates, the polarity of the liquid crystal has to be reversed in adjacent frames to avoid the DC residual effect. In the aforementioned embodiment, the voltage of the pixel electrode 272 is greater than or equal to the voltage of the common electrode 273, and the voltage of the transparent conductive layer 230 is greater than the voltage of the common electrode 273. After the polarity is reversed (in the next frame), the voltage of the pixel electrode 272 is smaller than the voltage of the common electrode 273, and therefore it may be set that the voltage of the transparent conductive layer 230 is smaller than the voltage of the common electrode 273, and the voltage of the common electrode 273 minus the voltage of the transparent conductive layer 230 is smaller than or equal to 2.3V for obtaining a preferred contrast ratio. In other words, the absolute voltage difference between the transparent conductive layer 230 and the common electrode 273 may be set as any voltage value which is greater than or equal to 0V and smaller than or equal to 2.3V, or as any voltage value which is smaller than or equal to 2.3V and greater than or equal to 1V, or as any voltage value which is smaller than or equal to 2V and greater than or equal to 1.4V, or as 1.7V for obtaining a preferred contrast ratio. Note that although the voltage of the common electrode 273 is 0V in the embodiments of FIG. 7A and FIG. 7B, when the voltage of the common electrode 273 is altered, the voltage of the transparent conductive layer 230 may be altered correspondingly. For example, if the voltage of the common electrode 273 is 1V, then the voltage of the transparent conductive layer 230 may be set to be smaller than or equal to 3.3V and greater than or equal to −1.3V; if the voltage of the common electrode 273 is −1V, then the voltage of the transparent conductive layer 230 may be set to be smaller than or equal to 1.3V and greater than or equal to −3.3V, and so on.

Referring to FIG. 7C and FIG. 7D, for the display panel having negative LC, when the voltage difference between the transparent conductive layer 230 and the common electrode 273 is in a range from 0V to 5V, the contrast ratio of the display panel is higher than 1350. Therefore, in some embodiments, the absolute voltage difference between the transparent conductive layer 230 and the common electrode 273 is set as any voltage value which is smaller than or equal to 5V and greater than or equal to 0V. In addition, when the voltage difference between the transparent conductive layer 230 and the common electrode 273 is greater than 4V or smaller than 1V, the contrast ratio of the display panel drops significantly. Therefore, in some embodiments, the absolute voltage difference between the transparent conductive layer 230 and the common electrode 273 is set as any voltage value which is smaller than or equal to 4V and greater than or equal to 1V. Moreover, when the voltage difference between the transparent conductive layer 230 and the common electrode 273 is greater than 3V or smaller than 2V, the contrast ratio of the display panel drops slightly. Therefore, in some embodiments, the absolute voltage difference between the transparent conductive layer 230 and the common electrode 273 is set as any voltage value which is smaller than or equal to 3V and greater than or equal to 2V. In some embodiments, the absolute voltage difference between the transparent conductive layer 230 and the common electrode 273 is preferably set as any voltage value which is smaller than or equal to 2.9V and greater than or equal to 2V to set a preferred range of the contrast ratio. In some embodiments, the absolute voltage difference between the transparent conductive layer 230 and the common electrode 273 is set as 2V to maximize the contrast ratio.

Figure 8A:
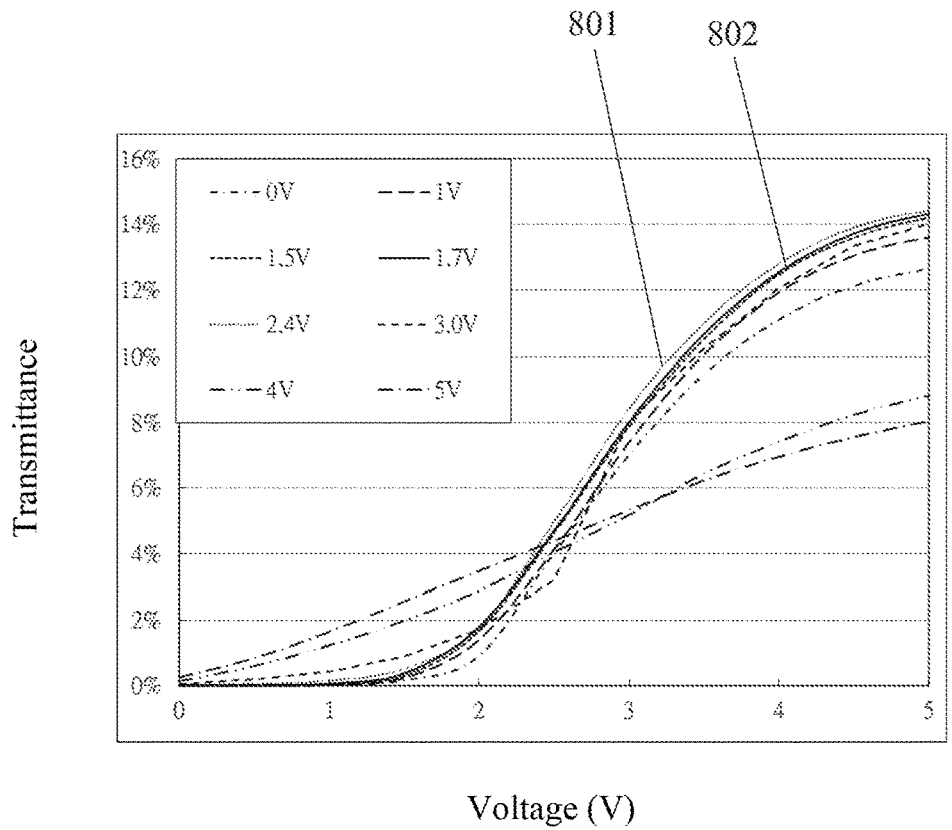
FIG. 8A and FIG. 8B are diagrams illustrating curves of transmittance of the display panel with different voltage differences between the transparent conductive layer 230 and the common electrode 273 in accordance with an embodiment.
Figure 8B:
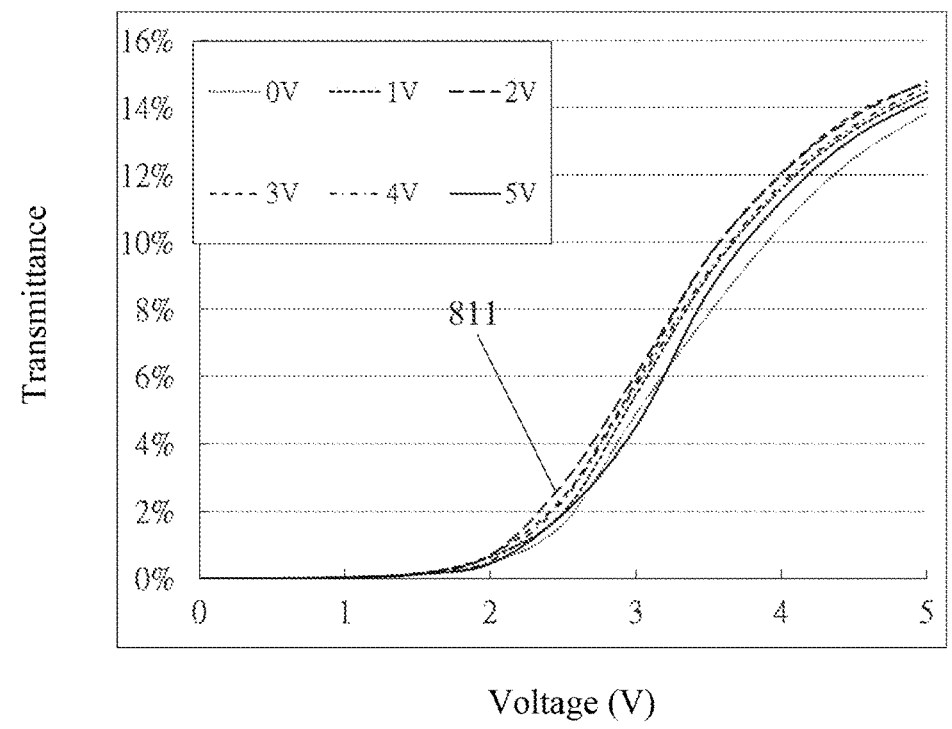

FIG. 8A and FIG. 8B are diagrams illustrating curves of transmittance of the display panel with different voltage differences between the transparent conductive layer 230 and the common electrode 273 in accordance with an embodiment. Curves of transmittance for the display panel having positive LC are illustrated in FIG. 8A, and curves of transmittance for the display panel having negative LC are illustrated in FIG. 8B. The horizontal axis represents the voltage difference between the pixel electrode 272 and the common electrode 273, and the vertical axis represents the transmittance. The label for each curve represents the voltage difference between the transparent conductive layer 230 and the common electrode 273. For clarity, not all data is shown in FIG. 8A and FIG. 8B. Complete data of FIG. 8A is shown in FIG. 8C and FIG. 8D, in which the first row represent the voltage difference between the transparent conductive layer 230 and the common electrode 273, and the first columns presents the voltage difference between the pixel electrode 272 and the common electrode 273, and other values represent the transmittances. In addition, complete data of FIG. 8B is shown in FIG. 8E. The drawing principle of FIG. 8E is similar to that of FIG. 8C and FIG. 8D. In FIG. 8A, the curve 801 and the curve 802 respectively represent the transmittances corresponding to the voltage differences 2.4V and 1.7V between the transparent conductive layer 230 and the common electrode 273. The curve 801 is close to the curve 802, but the contrast ratio drops when the voltage difference between the transparent conductive layer 230 and the common electrode 273 is 2.4V as shown in FIG. 7A and FIG. 7B, and therefore the display performance of the display panel in which the absolute voltage difference between the transparent conductive layer 230 and the common electrode 273 is 1.7V is better than that of the display panel in which the absolute voltage difference between the transparent conductive layer 230 and the common electrode 273 is 2.4V when both the transmittance and the contrast ratio are considered. Curves of transmittance for the voltage differences 0V, 1V, 2V, 3V, 4V and 5V between the transparent conductive layer 230 and the common electrode 273 are shown in FIG. 8B. The curve 811 represents the voltage of 2V. As shown in FIGS. 8B and 8E, all curves of transmittance are close to each other even the voltage differences between the transparent conductive layer 230 and the common electrode 273 are different from each other. The voltage difference between the transparent conductive layer 230 and the common electrode 273 may be set more flexibly to obtain better display performance for the display panel having negative LC, compared to the display panel having positive LC, because all contrast ratios in FIGS. 7C and 7D are very high even the voltage differences between the transparent conductive layer 230 and the common electrode 273 are different.

The display performance of the display panel is determined based on the contrast ratio and the transmittance. In addition, a circuit providing the voltage to the transparent conductive layer 230 is designed in accordance with the absolute voltage difference between the transparent conductive layer 230 and the common electrode 273. Accordingly, the absolute voltage difference between the transparent conductive layer 230 and the common electrode 273 can be set to be in an appropriate range based on the disclosure of FIG. 7A to FIG. 7D and FIG. 8C to FIG. 8E. For example, the absolute voltage difference between the transparent conductive layer 230 and the common electrode 273 may be set to be greater than or equal to x and smaller than or equal to y, where x and y are real numbers, and x is smaller than or equal to y. As discussed above, for the display panel having positive LC, the contrast ratio of the display panel drops significantly when the absolute voltage difference between the transparent conductive layer 230 and the common electrode 273 is greater than 2.3V, and the contrast ratio is higher than 1200 when the voltage difference between the transparent conductive layer 230 and the common electrode 273 is in a range from 0V to 2.3V. Therefore, the real number x may be 0, 1, 1.4, 1.7, or any real number in a range from 0 to 1.7 (e.g. 0, 1, 1.1, 1.2, 1.3, 1.4, 1.5, 1.6 or 1.7 as shown in FIG. 7A), and the real number y may be 1.7, 2.3, or any real number in a range from 1.7 to 2.3 (e.g. 1.7, 1.8, 1.9, 2, 2.1, 2.2 or 2.3 as shown in FIG. 7A) for the display panel having positive LC. For the display panel having negative LC, the contrast ratio of the display panel is higher than 1350 when the absolute voltage difference between the transparent conductive layer 230 and the common electrode 273 is in a range from 0V to 5V; the contrast ratio of the display panel drops significantly when the voltage difference between the transparent conductive layer 230 and the common electrode 273 is greater than 4V or smaller than 1V; and the contrast ratio of the display panel drops slightly when the absolute voltage difference between the transparent conductive layer 230 and the common electrode 273 is greater than 3V or smaller than 2V. Therefore, the real number x may be 0, 1, 2, or any real number in a range from 0 to 2, and the real number y may be 2, 2.3, 3, 4, or any real number in a range from 2 to 5 (e.g. 2, 2.1, 2.2, 2.3, 2.4, 2.5, 2.6, 2.7, 2.8, 2.9, 3.0, 4 or 5 as shown in FIG. 7C) for the display panel having negative LC. The circuit providing the voltage to the transparent conductive layer 230 is designed according to the absolute voltage difference between the transparent conductive layer 230 and the common electrode 273, and therefore a voltage value in the aforementioned range can be chosen as the absolute voltage difference between the transparent conductive layer 230 and the common electrode 273 according to the type of liquid crystal, the transmittance, the contrast ratio and the design of the circuit providing the voltages.

Figure 9A:
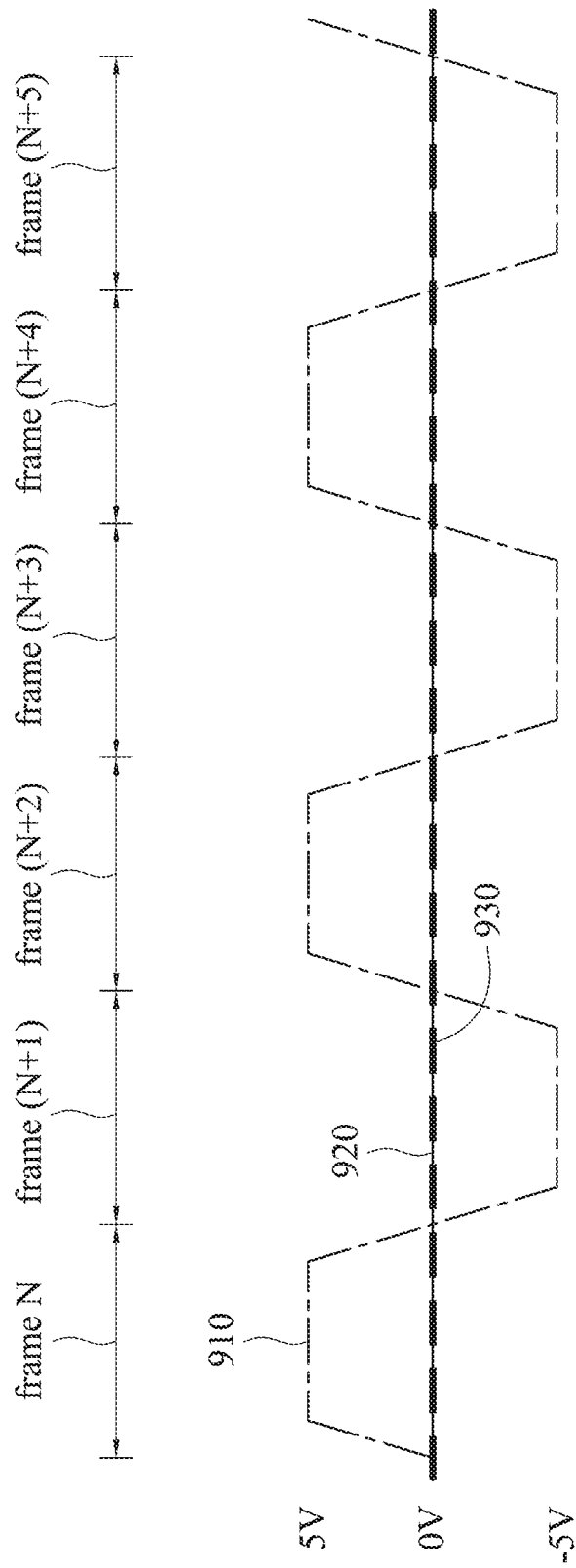
FIG. 9A is a diagram illustrating waveforms of the voltages of the pixel electrode 272, the common electrode 273 and the transparent conductive layer 230 in different frames in accordance with an embodiment.

FIG. 9A is a diagram illustrating waveforms of the voltages of the pixel electrode 272, the common electrode 273 and the transparent conductive layer 230 in different frames in accordance with an embodiment. In the embodiment, frames N to (N+5) are shown in FIG. 9A, in which N is a positive integer. The polarity of the liquid crystal molecule is reversed in adjacent frames. To be specific, the voltage of the pixel electrode 272 has a waveform 910 which amplitude is in a range from −5V to 5V. Note that the waveform 910 only represents the maximum absolute voltage of the pixel electrode 272 in each frame in FIG. 9A. However, the voltage of the pixel electrode 272 may be in the range from 0 to 5V in the frames N, (N+2) and (N+4), and in the range from 0 to −5V in the frames (N+1), (N+3) and (N+5). The voltage of the common electrode 273 has a waveform 920 which amplitude is fixed at 0V. In the frames N, (N+2) and (N+4), the voltage of the pixel electrode 272 is greater than or equal to the voltage of the common electrode 273. In the frames (N+1), (N+3) and (N+5), the voltage of the pixel electrode 272 is smaller than or equal to the voltage of the common electrode 273.

In the embodiment of FIG. 9A, the voltage of the transparent conductive layer 230 has a waveform 930 which is overlapped with the waveform 920. In other words, the voltage of the transparent conductive layer 230 and the voltage of the common electrode 273 are the same, and the voltage difference between the transparent conductive layer 230 and the common electrode 273 is 0V.

Figure 9B:
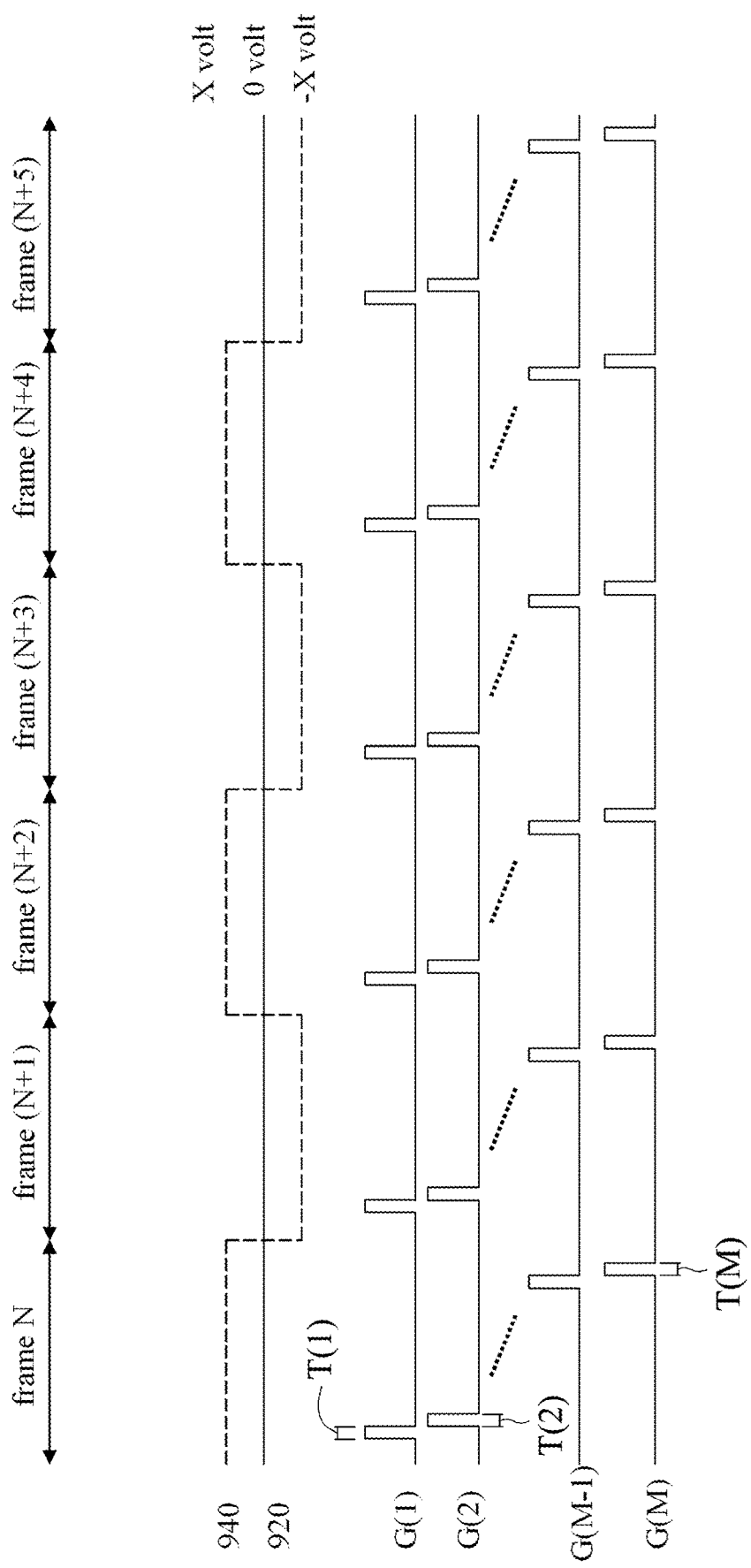
FIG. 9B is a diagram illustrating waveforms of the voltages of the gate lines, the common electrode 273 and the transparent conductive layer 230 of the display panel in different frames in accordance with another embodiment.
Figure 9C:
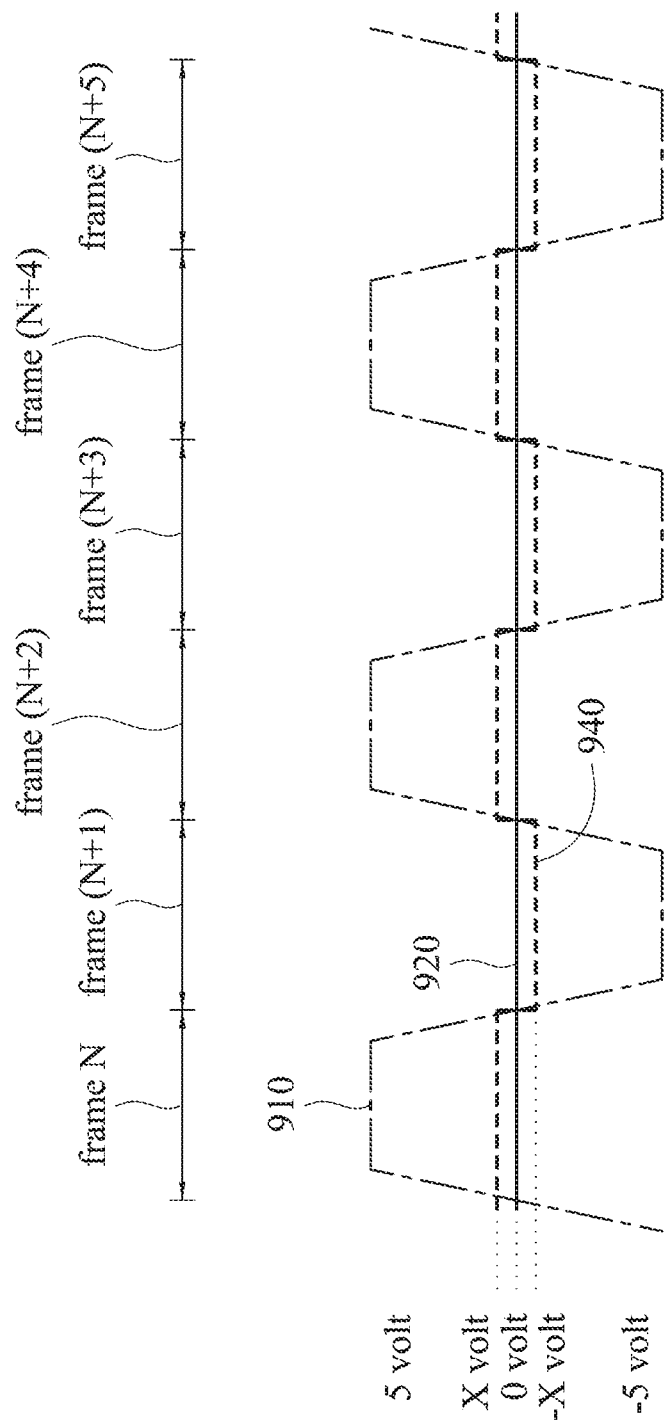
FIG. 9C is a diagram illustrating waveforms of the voltages of the pixel electrode 272, the common electrode 273, and the transparent conductive layer 230 in a pixel unit corresponding to FIG. 9B.

Referring to FIG. 9B and FIG. 9C, FIG. 9B is a diagram illustrating waveforms of the voltages of gate lines, the common electrode 273 and the transparent conductive layer 230 of the display panel in different frames in accordance with another embodiment, and FIG. 9C is a diagram illustrating waveforms of the voltages of the pixel electrode 272, the common electrode 273, and the transparent conductive layer 230 in a pixel unit corresponding to FIG. 9B. In the embodiment, the display panel includes M gate lines which respectively receive gate signals (also referred to as scan signals) G(1)-G(M) where M is a positive integer greater than or equal to 2. The gate signals G(1)-G(M) may be provided by a Gate Driver on Array (GOA) circuit or at least one chip, but the invention is not limited thereto. Frames N to (N+5) are shown in FIG. 9B and FIG. 9C, in which N is a positive integer with any value. The polarity of the liquid crystal molecule is reversed in adjacent frames. In each frame, the gate signals G(1)-G(M) switch from a low level to a high level sequentially to turn on the thin film transistors which are connected to the M gate lines, such that image signals are provided to the pixel electrodes through the data lines and the thin film transistors. The voltage of each gate signals G(1)-G(M) remains at the high level for a while (e.g. high level periods T(1)-T(M)) and then switches from the high level to the low level sequentially. The high level periods of every adjacent two of the gate signals G(1)-G(M) do not overlap with each other in the embodiment, but the invention is not limited thereto. In other embodiments, the high level periods of every adjacent two of the gate signals G(1)-G(M) partially overlay with each other. The voltage of the pixel electrode 272 has a waveform 910 in the range from −5V to 5V. Note that the waveform 910 only represents the maximum absolute voltage of the pixel electrode 272 in each frame in FIG. 9C. However, the voltage of the pixel electrode 272 may be in the range from 0 to 5V in the frames N, (N+2) and (N+4), and in the range from 0 to −5V in the frames (N+1), (N+3) and (N+5). The voltage of the common electrode 273 has a waveform 920 fixed at 0V. The voltage of the pixel electrode 272 is greater than or equal to the voltage of the common electrode 273 in the frames N, (N+2) and (N+4). The voltage of the pixel electrode 272 is less than or equal to the voltage of the common electrode 273 in the frames (N+1), (N+3) and (N+5). However, in the embodiment, the voltage of the transparent conductive layer 230 has a waveform 940, and the absolute voltage difference between the waveform 940 and the waveform 920 is X. The sign of the voltage difference between the transparent conductive layer 230 and the common electrode 273 changes due to the polarity reversal. In the frames N, (N+2) and (N+4), the voltage of the transparent conductive layer 230 is greater than the voltage of the common electrode 273; in the frames (N+1), (N+3) and (N+5), the voltage of the transparent conductive layer 230 is smaller than the voltage of the common electrode 273. As shown in FIG. 9B, in each of the frames N to (N+5), the gate signal G(i) of the $i^{th}$ gate line of the display panel has a corresponding high level period where i is a positive integer which is greater or equal to 1 and is less than or equal to the positive integer M. In the high level periods of the gate signal G(i) in the frames N, (N+2) and (N+4), the voltage of the transparent conductive layer 230 is greater than that of the common electrode 273; in the high level periods of the gate signal G(i) in the frames (N+1), (N+3) and (N+5), the voltage of the transparent conductive layer 230 is less than that of the common electrode 273. In detail, the voltage of the gate signal G(i) is at a high level in a first time period of a first frame and in a second time period of a second frame next to the first frame. The voltage of the common electrode 273 in the first time period is equal to the voltage of the common electrode 273 in the second time period. The voltage of the first transparent conductive layer 230 in the first time period is greater than the voltage of the common electrode 273, and the voltage of the first transparent conductive layer 230 in the second time period is less than the voltage of the common electrode 273; or the voltage of the first transparent conductive layer 230 in the first time period is less than the voltage of the common electrode 273, and the voltage of the first transparent conductive layer 230 in the second time period is greater than the voltage of the common electrode 273. In other words, in the embodiment, the voltage of the common electrode 273 is at a fixed level (i.e. the voltage of the common electrode 273 has a direct current (DC) waveform), but the voltage of the transparent conductive layer 230 changes in two adjacent frames (i.e. the voltage of the transparent conductive layer 230 has an alternative current (AC) waveform). As shown in FIG. 9B, in the embodiment, the voltage of the gate signal G(i) is at a high level in a first time period of a first frame and in a second time period of a second frame next to the first frame, the voltage of the first transparent conductive layer 230 in the first time period is at a fixed level, and the voltage of the first transparent conductive layer 230 in the second time period is at another fixed level. For example, the voltage of the first transparent conductive layer 230 keeps at X volt in the first time period, and the voltage of the first transparent conductive layer 230 keeps at –X volt in the second time period; or the voltage of the first transparent conductive layer 230 keeps at –X volt in the first time period, and the voltage of the first transparent conductive layer 230 keeps at X volt in the second time period. As discussed above, if positive LC is adopted, the absolute voltage difference between the transparent conductive layer 230 and the common electrode 273 is preferably 1.7V; and if negative LC is adopted, the absolute voltage difference between the transparent conductive layer 230 and the common electrode 273 is preferably 2V. Therefore, in the frames N, (N+2) and (N+4), the amplitude of the waveform 940 for the display panel with positive LC may be set as 1.7V, and the amplitude of the waveform 940 for the display panel with negative LC may be set as 2V. In the frames (N+1), (N+3) and (N+5), the amplitude of the waveform 940 for the display panel with positive LC may be set as –1.7V, and the amplitude of the waveform 940 for the display panel with negative LC may be set as –2V (that is, X is equal to 1.7 or 2). However, the amplitude of the waveform 940 is not limited thereto. A preferred absolute voltage difference between the transparent conductive layer 230 and the common electrode 273 can be chosen according to the type of the liquid crystal (positive or negative), the contrast ratio and the transmittance so as to design the waveform 940.

In the embodiments of FIG. 9A-9C, the voltage of the common electrode 273 is fixed and has DC waveform. In the embodiment of FIG. 9A, the voltage of the transparent conductive layer 230 is equal to the voltage of the common electrode 273, and thus both of the voltages of the transparent conductive layer 230 and the common electrode 273 have DC waveforms. In the embodiments of FIG. 9B and FIG. 9C, the waveform of the voltage of the transparent conductive layer 230 is different from that of the voltage of the common electrode 273, and the voltage of the transparent conductive layer 230 changes in adjacent two frames. That is to say, the voltage of the transparent conductive layer 230 has AC waveform.

Figure 9D:
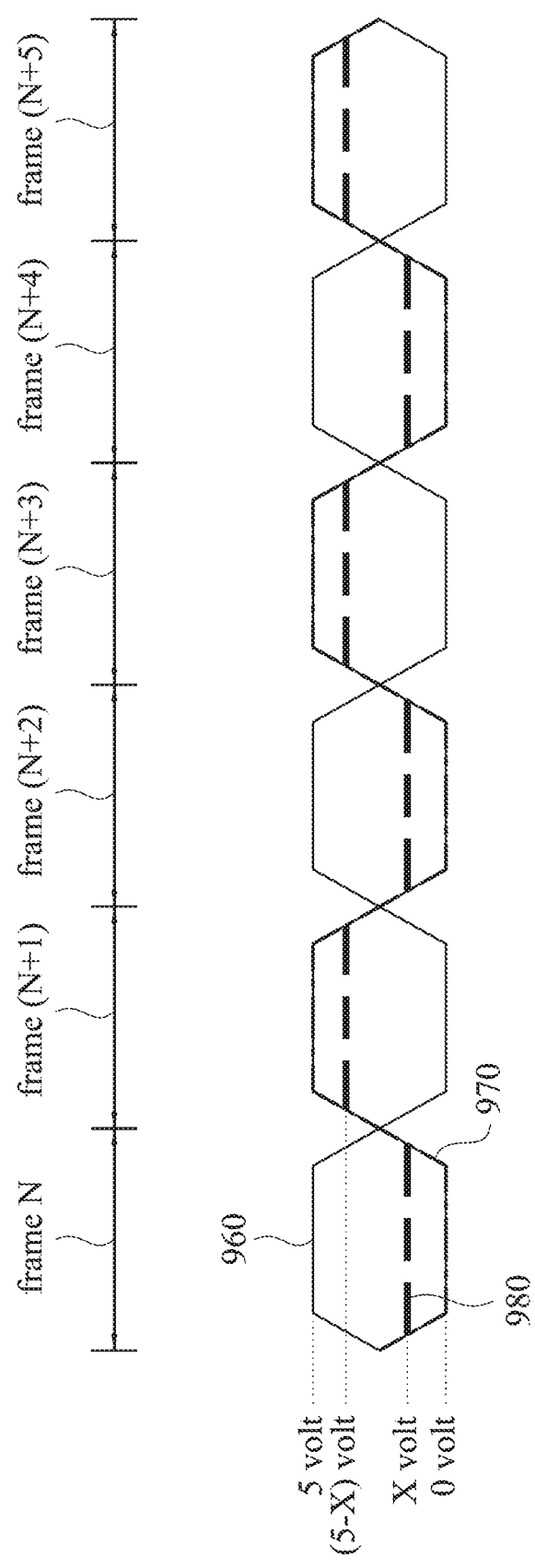
FIG. 9D is a diagram illustrating waveforms of the voltages of the pixel electrode 272, the common electrode 273 and the transparent conductive layer 230 in different frames in accordance with an embodiment.

Referring to FIG. 9D, FIG. 9D is a diagram illustrating waveforms of the voltages of the pixel electrode 272, the common electrode 273 and the transparent conductive layer 230 in different frames in accordance with another embodiment. The voltage of the pixel electrode 272 has a waveform 960, the voltage of the common electrode 273 has a waveform 970, and the voltage of the transparent conductive layer 230 has a waveform 980. The difference between FIGS. 9A-9C and FIG. 9D is that the voltage of the common electrode is fixed in FIGS. 9A-9C (that is, the voltage of the common electrode is DC); but in FIG. 9D, the voltage of the common electrode changes along with time (that is, the voltage of the common electrode has AC waveform) and it is also referred to as VCOM modulation. The range of the voltage of the pixel electrode 272 is narrowed by modulating the voltage of the common electrode 273, and thus the cost of a source driver is reduced. As shown in FIG. 9D, the amplitude of the waveform 970 for the common electrode 273 is 0V or 5V depending on which frame it is in, and the waveform 960 for the pixel electrode 272 is in a range from 0V to 5V.

In the frames N, (N+2) and (N+4), the voltage of the transparent conductive layer 230 (i.e. the waveform 980) is greater than or equal to the voltage of the common electrode 273 (i.e. the waveform 970); in the frames (N+1), (N+3) and (N+5), the voltage of the transparent conductive layer 230 (i.e. the waveform 980) is smaller than or equal to the voltage of the common electrode 273 (i.e. the waveform 970). In other words, in the embodiment of FIG. 9D, the voltage of the common electrode 273 and the voltage of the transparent conductive layer 230 have AC waveforms. For example, as discussed above, the absolute voltage difference between the transparent conductive layer 230 and the common electrode 273 is preferably set as 1.7V if positive LC is adopted; and the absolute voltage difference between the transparent conductive layer 230 and the common electrode 273 is preferably set as 2V is negative LC is adopted. Therefore, the amplitude of the waveform 980 may be set as 1.7V for the display panel with positive LC or 2V for the display panel with negative LC in the frames N, (N+2) and (N+4); the amplitude of the waveform 980 may be as 3.3V for the display panel with positive LC or 3V for the display panel with negative LC in the frames (N+1), (N+3) and (N+5); and that is, X is equal to 1.7 or 2. Similarly, the amplitude of the waveform 980 is not limited thereto. A preferred absolute voltage difference between the transparent conductive layer 230 and the common electrode 273 can be chosen according to the type of the liquid crystal (positive or negative), the contrast ratio and the transmittance so as to design the waveform 980.

Note that in the embodiments of FIG. 9A-9C, the voltage of the pixel electrode 272 is in a range from −5V to 5V, and the voltage of the common electrode 273 is fixed at 0V. However, the invention is not limited thereto. In other embodiments, the voltage of the common electrode 273 may be set as Y volts, in which Y is a real number not equal to 0. The voltage of the pixel electrode 272 is in a range from (−5+Y) to (5+Y) volts; the voltage of the transparent conductive layer 230 is fixed at Y volts (similar to the embodiment of FIG. 9A), or the absolute voltage difference between the transparent conductive layer 230 and the common electrode 273 is fixed (similar to the embodiment of FIG. 9B and FIG. 9C). In others words, in FIG. 9A-9C, if the waveform 920 for the voltage of the common electrode 273 is shifted upward or downward by Y volts, the waveform 910 for the voltage of the pixel electrode 272 is synchronously shifted upward or downward by Y volts, and the waveform 930 or 940 for the voltage of the transparent conductive layer 230 is synchronously shifted upward or downward by Y volts.

Similarly, in the embodiment of FIG. 9D, if the waveform 970 for the voltage of the common electrode 273 is shifted upward or downward by Y volts, the waveform 960 for the voltage of the pixel electrode 272 is synchronously shifted upward or downward by Y volts, and the waveform 980 for the voltage of the transparent conductive layer 230 is synchronously shifted upward or downward by Y volts. For example, assume the absolute voltage difference between the transparent conductive layer 230 and the common electrode 273 is set as 1.7V, and the waveform 970 (i.e. the voltage of the common electrode 273) is shifted upward by 1V. In other words, it is assumed that the voltage of the common electrode 273 is 1V in the frames N, (N+2) and (N+4), and is 6V in the frames (N+1), (N+3) and (N+5). Consequently, the waveform 960 (i.e. the voltage of the pixel electrode 272) is synchronously shifted upward by 1V, and the waveform 980 (i.e. the voltage of the transparent conductive layer 230) is synchronously shifted upward by 1V. That is to say, the maximum voltage of the pixel electrode 272 is 6V, and the voltage of the transparent conductive layer 230 is 2.7V in the frames N, (N+2) and (N+4); the minimum voltage of the pixel electrode 272 is 1V, and the voltage of the transparent conductive layer 230 is 4.3V in the frames (N+1), (N+3) and (N+5).

In addition, in the embodiments of FIG. 9A, FIG. 9C and FIG. 9D, the voltage difference between the pixel electrode 272 and the common electrode 273 is in a range from −5V to 5V, but the invention is not limited thereto. In other embodiments, the voltage difference between the pixel electrode 272 and the common electrode 273 may be in a range from −Z volts to Z volts, in which Z is a real number not equal to 5.

Note that although the structure of FIG. 2C is adopted in the embodiments of FIG. 7A to FIG. 8E, but the invention is not limited thereto. The difference between FIG. 2B/FIG. 2D and FIG. 2C is a variance of the sequence of the color filter layer 241/black matrix layer 242, the transparent conductive layer 230 and the over-coating layer 250 stacked on the second substrate 220. The voltage range for the transparent conductive layer 230 and the common electrode 273 (so that a preferred contrast ratio and transmittance can be obtained) described in the embodiments of FIG. 7A and FIG. 8E may be applied to the structures of FIG. 2B and FIG. 2D, and the detail will not be repeated.

Figure 10A:
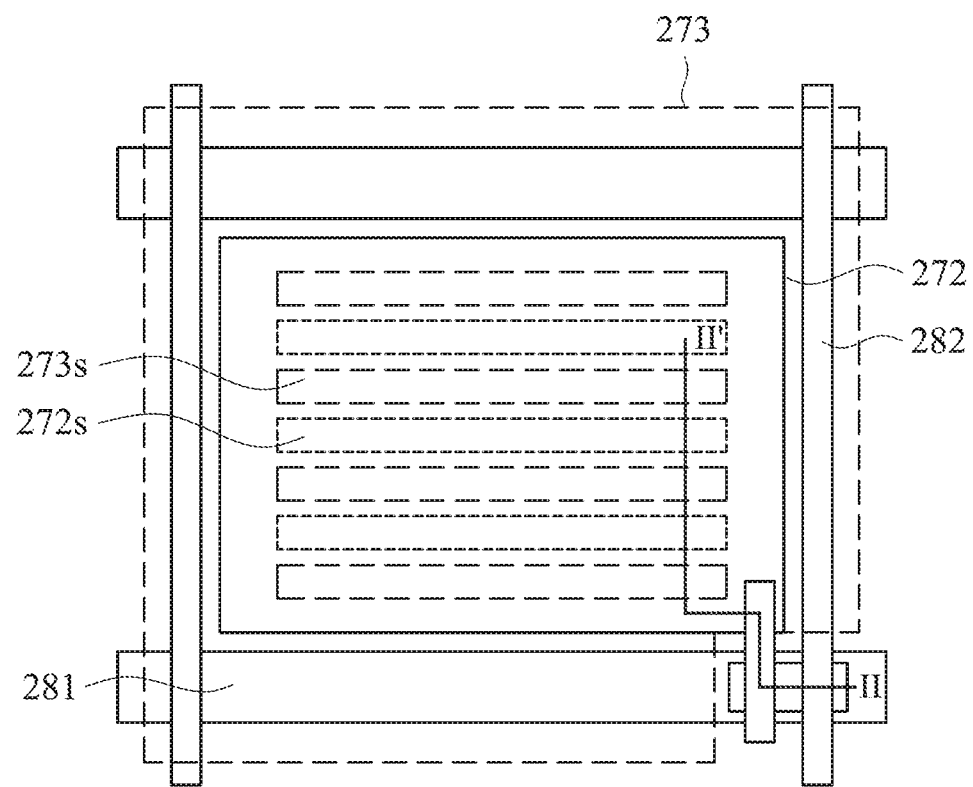
FIG. 10A is a diagram illustrating the top view of the display panel in accordance with another embodiment.
Figure 10B:
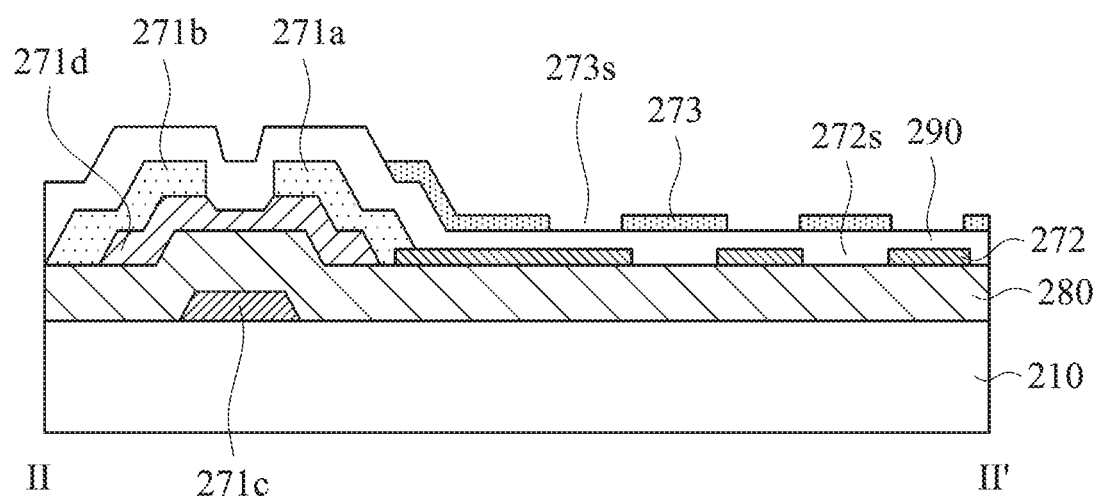
FIG. 10B is a diagram illustrating a cross-sectional view of the display panel along a cut line II-II' in FIG. 10A.
Figure 10C:
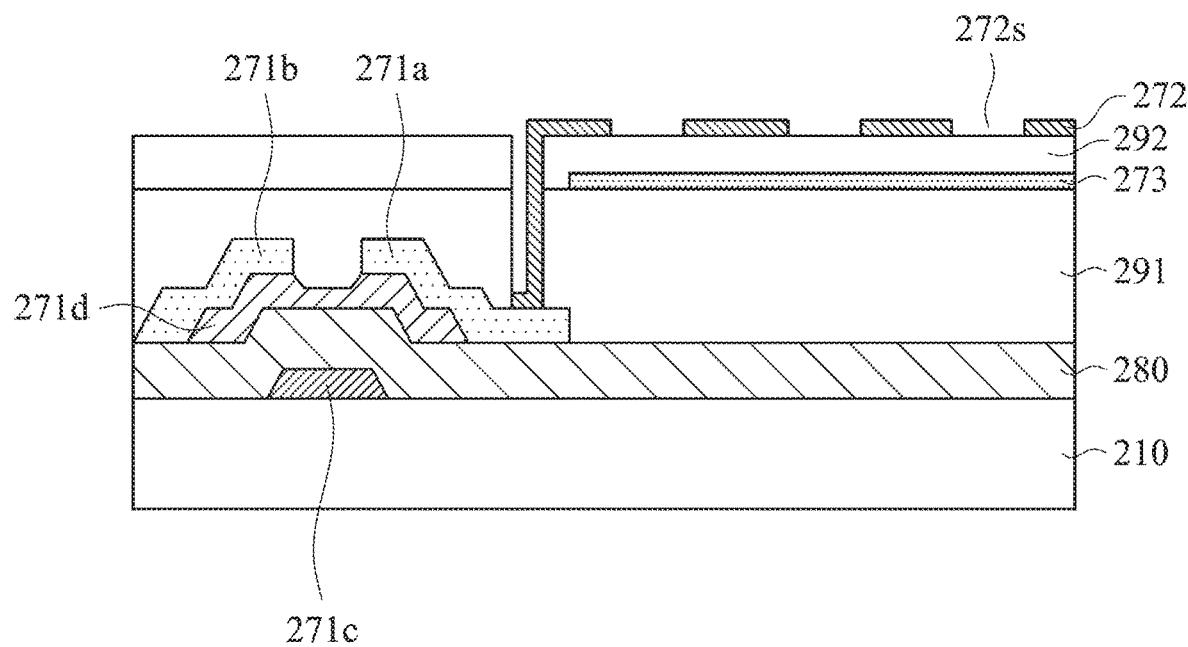
FIG. 10C and FIG. 10D are diagrams illustrating the cross-sectional view of the display panel in accordance with different embodiments.
Figure 10D:
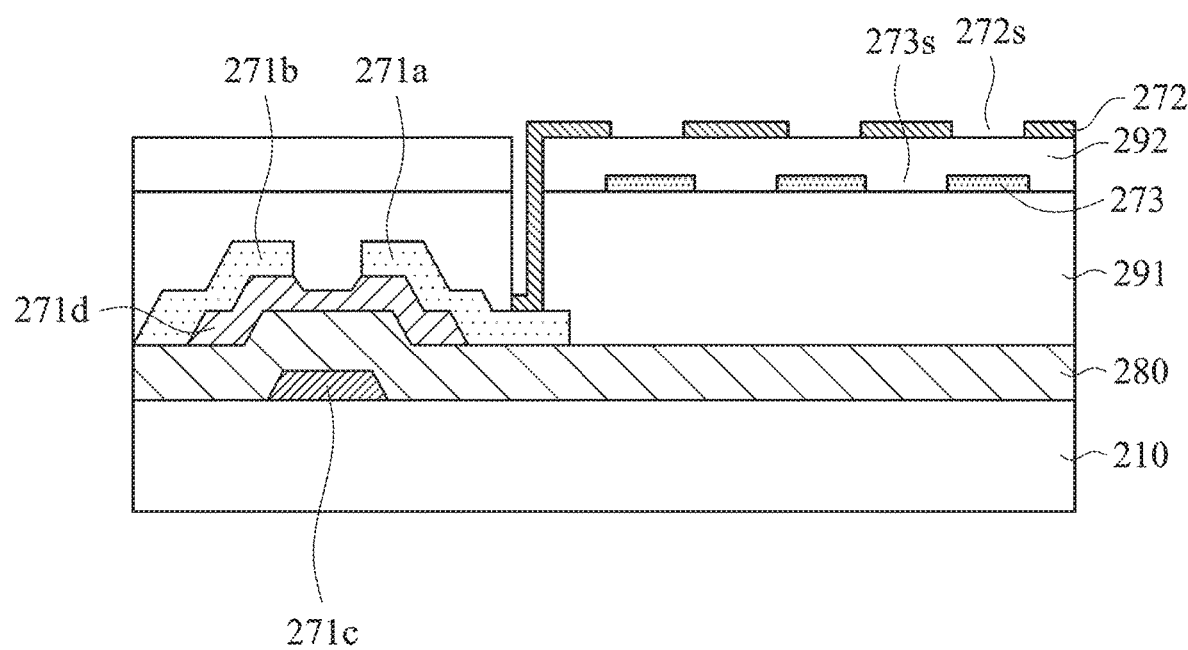
Figure 10E:
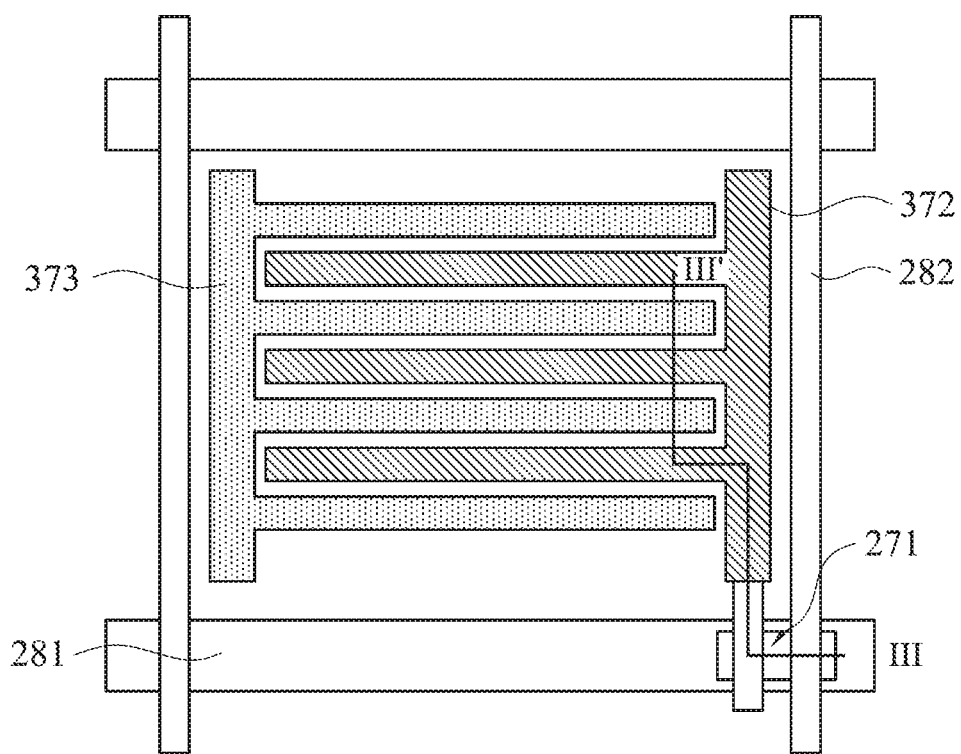
FIG. 10E is a diagram illustrating the top view of a pixel structure in a conventional IPS display panel.
Figure 10F:
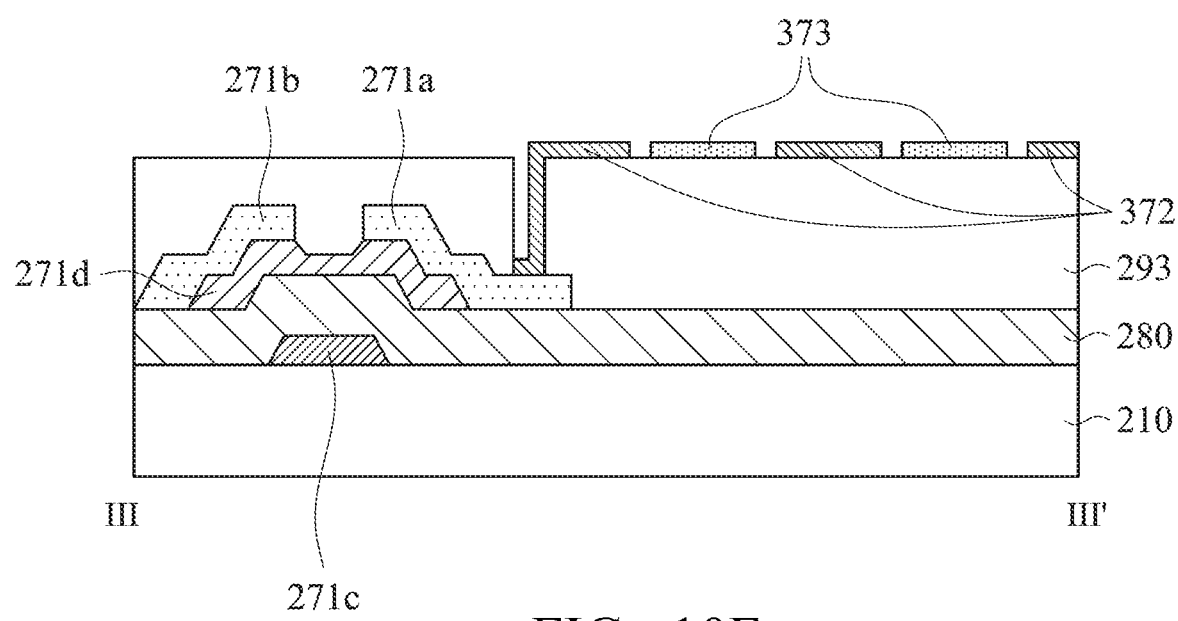
FIG. 10F is a diagram illustrating a cross-sectional view of the display along with a cut line III-III' in FIG. 10E.

Moreover, the transverse-electric-field type display panel of FIG. 2C is adopted in the embodiments of FIG. 7A to FIG. 8E, that is, the pixel electrode 272 is beneath the common electrode 273, the pixel electrode 272 has a plate structure, and the common electrode 273 has the slits 273s. However, the preferred voltage ranges for the transparent conductive layer 230 and the common electrode 273 described in the embodiments of FIG. 7A to FIG. 8E may be applied to other transverse-electric-field type display panels. For example, referring to FIG. 10A and FIG. 10B, FIG. 10A is a diagram illustrating the top view of the display panel in accordance with another embodiment, and FIG. 10B is a diagram illustrating a cross-sectional view of the display panel along a cut line II-II' in FIG. 10A. Note that the second substrate, the transparent conductive layer, the color filter layer, the black matrix layer and the over-coating layer are not shown in FIG. 10B. People in the art should be able to apply the disposition of the second substrate, the transparent conductive layer, the color filter layer, the black matrix layer and the over-coating layer of FIG. 2B-2D to the cross-sectional structure of FIG. 10B. The difference between FIG. 10A and FIG. 2A is that, in FIG. 10A, the pixel electrode 272 has multiple slits 272s which are interlaced with the slits 273s of the common electrode 273. Referring to FIG. 10C, the difference between FIG. 10C and FIG. 2B is: in the embodiment of FIG. 2B, the pixel electrode 272 is beneath the common electrode 273, and the common electrode 273 has the slits 273s; in the embodiment of FIG. 10C, the pixel electrode 272 is above the common electrode 273, the pixel electrode 272 has the slits 272s, and the common electrode 273 has a plate structure. In the structure of FIG. 10C, the common electrode 273 is formed on the insulation layer 291, and an insulation layer 292 is formed between the common electrode 273 and the pixel electrode 272. Referring to FIG. 10D, the difference between FIG. 10D and FIG. 10B is: in the embodiment of FIG. 10B, the pixel electrode 272 is beneath the common electrode 273, and the pixel electrode 272 and the common electrode 273 respectively have the slits 272s and the slits 273s interlaced with each other; in the embodiment of FIG. 10D, the pixel electrode 272 is above the common electrode 273, and the pixel electrode 272 and the common electrode 273 respectively have the slits 272s and the slits 273s interlaced with each other. Referring to FIG. 10E and FIG. 10F, FIG. 10E is a diagram illustrating the top view of a pixel structure in an IPS display panel, and FIG. 10F is a diagram illustrating a cross-sectional view of the display along with a cut line III-III' in FIG. 10E. As shown in FIG. 10E and FIG. 10F, the pixel electrode 372 and the common electrode 373 are formed on the same surface of the insulation layer 293. In other words, the pixel electrode 372 and the common electrode 373 are disposed on the insulation layer 293 coplanarly. The material of the pixel electrode 372 and the common electrode 373 may include transparent conductive material. The pixel electrode 372 and the common electrode 373 respectively include multiple finger-type electrodes, and the finger-type electrodes of the pixel electrode 372 are interlaced with the finger-type electrodes of the common electrode 373. Similarly, the second substrate, the transparent conductive layer, the color filter layer, the black matrix layer and the over-coating layer are not shown in FIG. 10C, FIG. 10D and FIG. 10F. People in the art should be able to apply the disposition of the second substrate, the transparent conductive layer, the color filter layer, the black matrix layer and the over-coating layer of FIG. 2B-2D to the cross-sectional structures of FIG. 10C, FIG. 10D and FIG. 10F. The preferred voltage range for the transparent conductive layer 230 and the common electrode 273 described in the embodiments of FIG. 7A to FIG. 8E may be applied to the transverse-electric-field type display panel shown in FIG. 10A to FIG. 10F.

In the display panel provided in the embodiments of the invention, the transparent conductive layer is disposed between the second substrate and the liquid crystal layer to reduce the cost of the display panel and also to provide the shielding function from interference of electromagnetic wave and the accumulation of electrostatic charges. In addition, the display panel has better contrast ratio and transmittance by controlling the voltage of the transparent conductive layer within in a particular range.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display panel, comprising:
   a first substrate;
   a second substrate disposed opposite to the first substrate;
   first to $M^{th}$ gate lines disposed on the first substrate, wherein first to $M^{th}$ gate signals are provided to the first to $M^{th}$ gate lines respectively, an $i^{th}$ gate signal is at a high level in a first time period of a first frame and in a second time period of a second frame next to the first frame, M is a positive integer greater than or equal to 2, and i is a positive integer less than or equal to the positive integer M;
   a plurality of pixel structures disposed between the first substrate and the second substrate, wherein each of the pixel structures comprises a thin film transistor, a pixel electrode and a common electrode;
   a liquid crystal layer disposed between the pixel structures and the second substrate; and
   a transparent conductive layer disposed between the second substrate and the liquid crystal layer,
   wherein when a liquid crystal molecule of the liquid crystal layer is a positive liquid crystal molecule, an absolute voltage difference between the transparent conductive layer and the common electrode is smaller than or equal to 2.3 volts(V) and is greater than or equal to 1V, a voltage of the transparent conductive layer is greater than a voltage of the common electrode in the first time period, the voltage of the transparent conductive layer is less than the voltage of the common electrode in the second time period, and the voltage of the common electrode in the first time period is the same as the voltage of the common electrode in the second time period; or
   when the liquid crystal molecule of the liquid crystal layer is a negative liquid crystal molecule, the absolute voltage difference between the transparent conductive layer and the common electrode is smaller than or equal to 4V and is greater than or equal to 1V, the voltage of the transparent conductive layer is greater than the voltage of the common electrode in the first time period, the voltage of the transparent conductive layer is less than the voltage of the common electrode in the second time period, and the voltage of the common electrode in the first time period is the same as the voltage of the common electrode in the second time period.

2. The display panel of claim 1, wherein when the liquid crystal molecule of the liquid crystal layer is the positive liquid crystal molecule, the absolute voltage difference between the transparent conductive layer and the common electrode is smaller than or equal to 2V and is greater than or equal to 1.4V.

3. The display panel of claim 2, wherein when the liquid crystal molecule of the liquid crystal layer is the positive liquid crystal molecule, the absolute voltage difference between the transparent conductive layer and the common electrode is equal to 1.7V.

4. The display panel of claim 1, wherein when the liquid crystal molecule of the liquid crystal layer is the negative liquid crystal molecule, the absolute voltage difference between the transparent conductive layer and the common electrode is smaller than or equal to 3V and is greater than or equal to 2V.

5. The display panel of claim 4, wherein when the liquid crystal molecule of the liquid crystal layer is the negative liquid crystal molecule, the absolute voltage difference between the transparent conductive layer and the common electrode is equal to 2V.

6. The display panel of claim 1, further comprising:
   an insulation layer disposed on the thin film transistor, wherein the insulation layer is disposed on the pixel electrode, the common electrode is disposed on the insulation layer, and the common electrode has a plurality of slits.

7. The display panel of claim 1, further comprising:
   an insulation layer disposed on the thin film transistor, wherein the insulation layer is disposed on the common electrode, the pixel electrode is disposed on the insulation layer, and the pixel electrode has a plurality of slits.

8. The display panel of claim 1, further comprising:
   an insulation layer disposed on the thin film transistor, wherein the pixel electrode and the common electrode are disposed on the insulation layer coplanarly, each of the common electrode and the pixel electrode respectively comprises a plurality of finger-type electrodes, and the finger-type electrodes of the common electrode are interlaced with the finger-type electrodes of the pixel electrode.

9. The display panel of claim 1, further comprising:
   a black matrix layer disposed between the second substrate and the liquid crystal layer, wherein the transparent conductive layer is disposed between the second substrate and the black matrix layer.

10. The display panel of claim 1, further comprising:
    a black matrix layer disposed between the second substrate and the liquid crystal layer; and
    an over-coating layer disposed between the black matrix layer and the liquid crystal layer, wherein the transparent conductive layer is disposed between the black matrix layer and the over-coating layer.

11. The display panel of claim 1, further comprising:
    a black matrix layer disposed between the second substrate and the liquid crystal layer; and
    an over-coating layer disposed between the black matrix layer and the liquid crystal layer, wherein the transparent conductive layer is disposed between the overcoating layer and the liquid crystal layer.

12. The display panel of claim 1, wherein the absolute voltage difference between the transparent conductive layer and the common electrode in the first time period is the same as that in the second time period.

13. The display panel of claim 1, wherein the voltage of the common electrode has a direct current (DC) waveform, and the voltage of the transparent conductive layer has an alternative current (AC) waveform.

\* \* \* \* \*